US011727124B2

(12) United States Patent
Yeo et al.

(10) Patent No.: US 11,727,124 B2
(45) Date of Patent: Aug. 15, 2023

(54) OBLIVIOUS ACCESS WITH DIFFERENTIAL PRIVACY

(71) Applicant: Google LLC, Mountain View, CA (US)

(72) Inventors: Kevin Yeo, Mountain View, CA (US); Sarvar Patel, Montville, NJ (US); Giuseppe Persiano, New York, NY (US)

(73) Assignee: Google LLC, Mountain View, CA (US)

( * ) Notice: Subject to any disclaimer, the term of this patent is extended or adjusted under 35 U.S.C. 154(b) by 276 days.

(21) Appl. No.: 16/623,311

(22) PCT Filed: Jan. 12, 2018

(86) PCT No.: PCT/US2018/013469
§ 371 (c)(1),
(2) Date: Dec. 16, 2019

(87) PCT Pub. No.: WO2019/117978
PCT Pub. Date: Jun. 20, 2019

(65) Prior Publication Data
US 2020/0387615 A1 Dec. 10, 2020

Related U.S. Application Data

(60) Provisional application No. 62/597,781, filed on Dec. 12, 2017.

(51) Int. Cl.
G06F 21/60 (2013.01)
G06F 16/2458 (2019.01)
(Continued)

(52) U.S. Cl.
CPC .......... G06F 21/602 (2013.01); G06F 3/064 (2013.01); G06F 3/067 (2013.01); G06F 3/0623 (2013.01);
(Continued)

(58) Field of Classification Search
CPC .. G06F 21/602; G06F 16/2471; G06F 3/0623; G06F 3/064; G06F 3/067;
(Continued)

(56) References Cited

U.S. PATENT DOCUMENTS 5,123,045 A 6/1992 Ostrovsky et al.
6,553,409 B1 * 4/2003 Zhang ................. G06F 12/0815
711/147
(Continued)

FOREIGN PATENT DOCUMENTS

CN 105610793 A 5/2016
CN 107346401 A 11/2017
(Continued)

OTHER PUBLICATIONS

Zhang, "In-Memory Big Data Management and Processing: A Survey", Jul. 2015, IEEE, pp. 1920-1947 (Year: 2015).*
(Continued)

Primary Examiner — Noura Zoubair
Assistant Examiner — Gregory A Lane
(74) Attorney, Agent, or Firm — Honigman LLP; Brett A. Krueger

(57) ABSTRACT

A method executing an instruction (300) to execute a query (q) for a data block (102) and determining whether the data block is stored in a block stash (370). When the data block is stored in the block stash during a download phase, the method includes removing the data block from the block stash, sending a fake query (304) to a distributed system (140) to retrieve a random data block stored in memory (114) of a distributed system (140), and discarding the random data block. When a current version of the data block is stored in the block stash during an overwrite phase, the method includes sending a fake query to the distributed system to retrieve another random data block stored in the
(Continued)

memory of the distributed system, decrypting and re-encrypting the random data block with fresh randomness, and re-uploading the re-encrypted random data block onto the distributed system.

12 Claims, 19 Drawing Sheets

(51) Int. Cl.
    *G06F 3/06*     (2006.01)
    *G06F 12/14*     (2006.01)
    *G06F 21/62*     (2013.01)

(52) U.S. Cl.
    CPC ...... *G06F 12/1408* (2013.01); *G06F 16/2471* (2019.01); *G06F 21/6227* (2013.01); *G06F 2212/1052* (2013.01); *G06F 2221/2123* (2013.01)

(58) Field of Classification Search
    CPC ............. G06F 12/1406; G06F 21/6227; G06F 2212/1052; G06F 2221/2123
    USPC ........................................................ 713/193
    See application file for complete search history.

(56) References Cited

U.S. PATENT DOCUMENTS

| | | | |
|---|---|---|---|
| 2005/0246393 A1* | 11/2005 | Coates | H04L 67/1097 |
| 2014/0006357 A1* | 1/2014 | Davis | G06F 11/1446 |
| | | | 707/667 |
| 2014/0007250 A1 | 1/2014 | Stefanov et al. | |
| 2016/0330180 A1 | 11/2016 | Egorov et al. | |
| 2017/0077950 A1* | 3/2017 | Pavlov | H03M 13/05 |
| 2017/0185534 A1* | 6/2017 | Wagh | G06F 21/00 |

FOREIGN PATENT DOCUMENTS

| | | |
|---|---|---|
| JP | 2014-044551 A | 3/2014 |
| JP | 2016-081522 A | 5/2016 |
| WO | 2011/013490 A1 | 2/2011 |
| WO | 2014151157 A2 | 9/2014 |

OTHER PUBLICATIONS

"A Survey and Analysis of Solutions to the Oblivious Memory Access Problem" by Erin Elizabeth Chapman, 2012.
"Remote Oblivious Storage: Making Oblivious RAM Practical" Boneh et al., Mar. 30, 2011.
"The Melbourne Shuffle: Improving Oblivious Storage in the Cloud" Ohrimenko et al., Feb. 22, 2014.
International Search Report and Written Opinion for the U.S. Appl. No. 15/878,871 dated Apr. 6, 2018.
Li U Chang et al: "Search pattern leakage i n searchable encryption: Attacks and new construction", Information Sciences, vol. 265, Nov. 27, 2013 (Nov. 27, 2013), pp. 176-188, XP028605568, ISSN: 0020-0255, DOI: 10.1016/J.I NS.2013.11. 021 Abstract, Section 5.
Peter Williams et al : "PrivateFS", Proceedings of The 2012 ACM Conference On Computer and Communications Security, CCS '12, Oct. 16, 2012 (Oct. 16, 2012), pp. 977-988, XP055500903, New York, New York, USA DOI: 10.1145/2382196.2382299 ISBN: 978-1-4503-1651-4 Abstract, Secti ons 2-5.
International Search Report and Written Opinion for the Application No. PCT/US2018/013469 dated Jan. 12, 2018.
JPO, Office Action relating to Application No. 2021-112628, dated Jun. 14, 2022.
Chinese Office Action for the related Application No. 201880037200.0 dated Dec. 14, 2022, 14 pages.

* cited by examiner

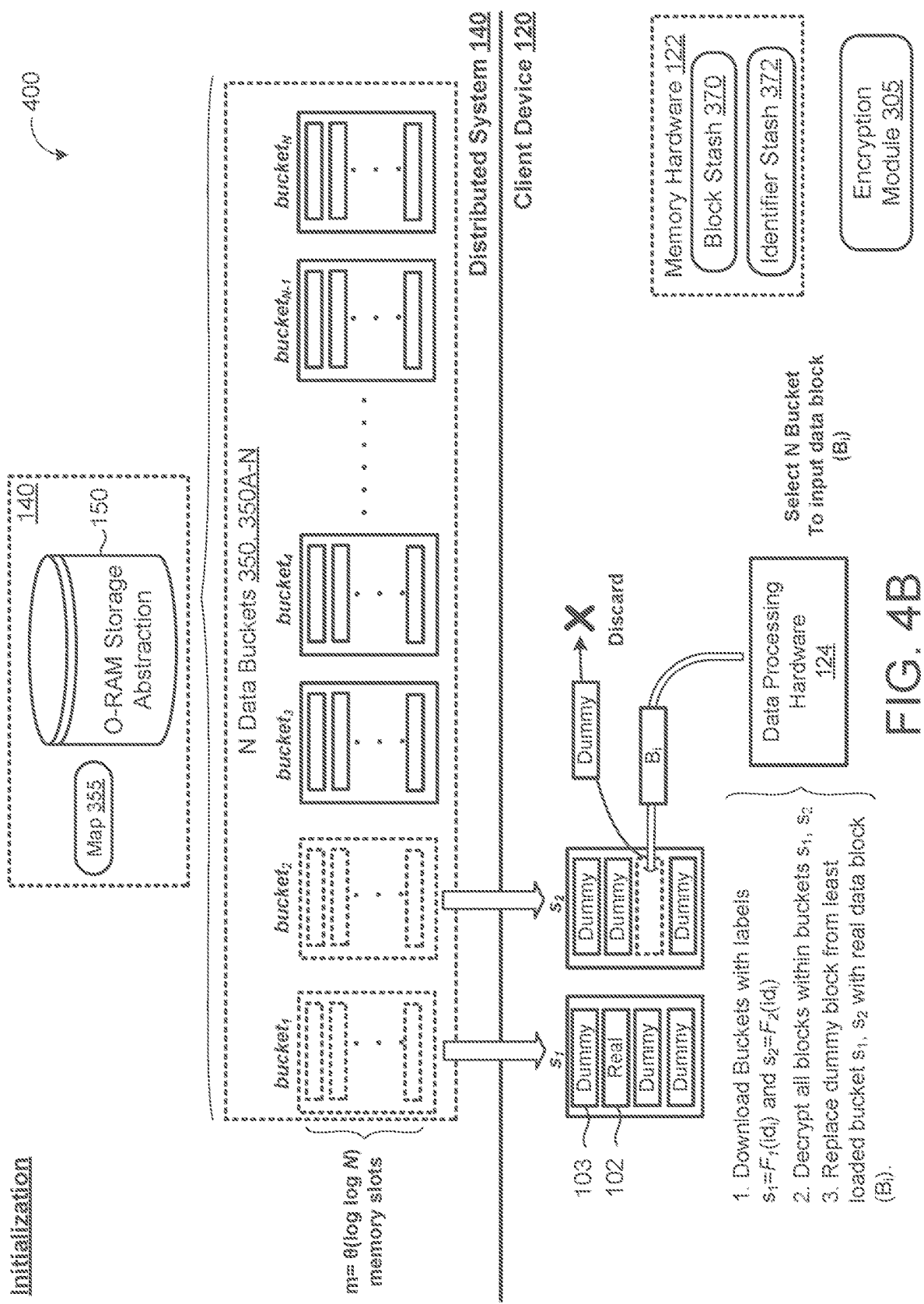

We use a hash function $H_K : \mathcal{K} \to [L]$ with a randomly chosen key $K$. For each $i \in [N]$, block $B_i$ is inserted into bucket $H_K(k_i)$. Insertion into bucket $H_K(k_i)$ is performed as follows:

1. Bucket $H_K(k_i)$ is downloaded. That is, all blocks stored in nodes on the unique path from the root to the $H_K(k_i)$-th leaf. Decrypt all blocks.

2. If no dummy block remains in bucket $H_K(k_i)$, then block $B_i$ is placed into the stash. If the stash is completely full already, then the algorithm fails.

3. When there is a dummy block in bucket $H_K(k_i)$, the dummy block occupying the smallest level (closest to the leaf) is removed and replaced by $B_i$.

4. Encrypt all blocks of bucket $H_K(k_i)$ and place them back into their corresponding locations on the tree.

To query for block $B_i$, the client simply computes $H_K(k_i)$ and retrieves bucket $H_K(k_i)$. All blocks are decrypted and the corresponding block is found either in the decrypted blocks or in the client stash.

FIG. 6

We use $D$ hash functions $H_K : \mathcal{K} \to [N]$ with $D$ randomly chosen keys $K_1, \ldots, K_D$. To insert block $B_i$ with identifier $k_i$ is done as follows:

1. All $D$ buckets $H_{K_1}(k_i), \ldots, H_{K_D}(k_i)$ are downloaded. That is, all blocks stored in nodes on the unique path from the root to the $H_{K_1}(k_i), \ldots, H_{K_D}(k_i)$-th leaf. Decrypt all blocks.

2. If no dummy block remains in any $D$ buckets, then block $B_i$ is placed into the stash. If the stash is completely full already, then the algorithm fails.

3. When there is a dummy block in any of the $D$ buckets, the dummy block occupying the smallest level (closest to the leaf) is removed and replaced by $B_i$.

4. Encrypt all blocks of all $D$ buckets and place them back into their corresponding locations on the tree.

To query block $B_i$, we simply download all the $D$ buckets, $H_{K_1}(k_i), \ldots, H_{K_D}(k_i)$. Decrypt all blocks in all $D$ buckets. Afterwards, we check any of the $D$ buckets or the stash for block $B_i$.

FIG. 8

OBLIVIOUS ACCESS WITH DIFFERENTIAL PRIVACY

TECHNICAL FIELD

This disclosure relates to obliviously accessing data blocks stored on memory with differential privacy.

BACKGROUND

Enterprises and individuals are using distributed storage systems (i.e., cloud storage services) to store data on memory overlying multiple memory locations. Many of these enterprises and individuals encrypt their data before uploading onto distributed storage system. In order to use essential functionalities offered by the cloud storage services, such as performing search queries on stored data, enterprises are required to provide plaintext access to the cloud storage services. As a result, many government and sensitive private sectors, such as health, finance, and legal, or reluctant to use cloud storage services, despite their increased convenience and cost advantages. Additionally, encryption alone may not suffice for ensuring data privacy, as the mere knowledge of data access patterns can provide a significant amount of information about the data without ever needing to decrypt the data.

DESCRIPTION OF DRAWINGS

FIGS. 4A-4C are schematic views of an example DP oblivious storage routine for obliviously inputting data blocks in encrypted form onto non-transitory data storage of a distributed system.

FIG. 6 provides an example algorithm initializing the binary tree by inputting data blocks in encrypted form into corresponding buckets and executing a query for a data block.

FIG. 8 provides an example algorithm initializing a reverse exponential tree by inputting the data blocks in encrypted form into corresponding N buckets and executing a query for a data block.

Like reference symbols in the various drawings indicate like elements.

SUMMARY

Figure 1A:
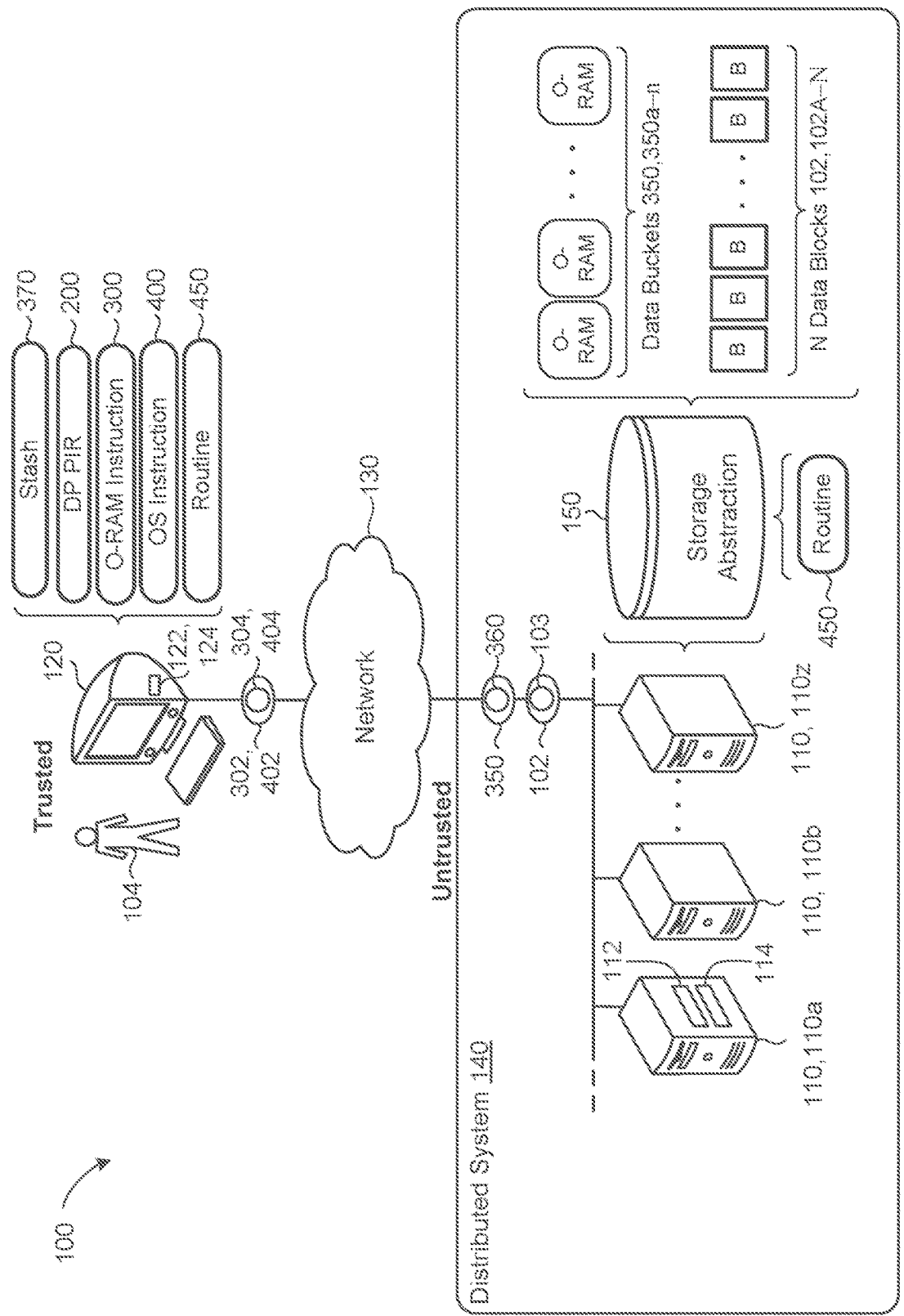
FIG. 1A is a schematic view of an example system for obliviously executing queries for data blocks stored on non-transitory data storage of a distributed system.

One aspect of the disclosure provides a method for oblivious access with differential privacy. The method includes executing, by data processing hardware of a client device, an instruction to execute a query (q) for a data block. The method also includes, during a download phase, determining, by the data processing hardware, whether the data block is stored in a block stash on memory hardware residing at the client device. When the data block is stored in the block stash, the method further includes: removing, by the data processing hardware, the data block from the block stash; sending, by the data processing hardware, a fake query to a distributed system in communication with the data processing hardware; and discarding, by the data processing hardware, the random data block retrieved from the distributed system. The fake query retrieves a random data block stored in memory of the distributed system. During an overwrite phase, the method also includes executing, by the data processing hardware, a read or write operation on the data block removed from the block stash or retrieved from the memory of the distributed system. The method further includes determining, by the data processing hardware, whether to store a current version of the data block in the block stash on the memory hardware residing at the client device or on the memory of the distributed system based on a probability. When the current version of the data block is stored in the block stash, the method includes: sending, by the data processing hardware, a fake query to the distributed system to retrieve another random data block stored in the memory of the distributed system; decrypting, by the data processing hardware, the retrieved random data block; re-encrypting, by the data processing hardware, the random data block with fresh randomness; and re-uploading, by the data processing hardware, the re-encrypted random data block onto the memory of the distributed system.

Implementations of the disclosure may include one or more of the following optional features. In some implementations, when the data block is not stored in the block stash during the download phase, the method includes sending, by the data processing hardware, a real query to the distributed system to retrieve the data block from the memory of the distributed system. When executing the read or write operation on the data block during the overwrite phase, the method may also include executing a write operation by updating the data block with a new version of the data block. In some configurations, the probability is less than (C/N), where C is a storage capacity of the block stash and N is a number of data blocks outsourced by the data processing hardware for storage on the distributed system.

In some examples, when the current version of the data block is not stored in the block stash during the overwrite phase, the method also includes the following: sending, by the data processing hardware, a real query to the distributed system to retrieve the data block from the memory of the distributed system; encrypting, by the data processing hardware, the current version of the data block; and uploading, by the data processing hardware, the encrypted current version of the data block onto the memory of the distributed system. Here, the method may further include discarding the data block retrieved from the memory of the distributed system.

Another aspect of the disclosure provides a method for oblivious access with differential privacy. The method includes executing, by data processing hardware of a client device, an instruction to execute a query (q) for a data block. During a download phase, the method includes determining, by the data processing hardware, whether the data block is stored in a block stash on memory hardware residing at the client device. When the data block is stored in the block stash, the method also includes: removing, by the data processing hardware, the data block from the block stash; sending, by the data processing hardware, a fake query to a distributed system in communication with the data processing hardware; and discarding, by the data processing hardware, the random data buckets retrieved from the distributed system. The fake query downloads two random data buckets stored in memory of the distributed system and each of the data buckets includes multiple data blocks. During an overwrite phase, the method further includes executing, by the data processing hardware, a read or write operation on the data block removed from the block stash or obtained from a corresponding data bucket retrieved from memory of the distributed system. The method also includes determining, by the data processing hardware, whether to store a current version of the data block in the block stash or on the memory of the distributed system based on a probability. When the current version of the data block is stored in the block stash, the method includes: sending, by the data processing hardware, a fake query to the distributed system to download another two random data buckets stored in the memory of the distributed system, each data bucket including multiple data blocks; decrypting, by the data processing hardware, all of the data blocks within the random data buckets; re-encrypting, by the data processing hardware, the data blocks within the random data buckets with fresh randomness; and re-uploading, by the data processing hardware, the random data buckets including the re-encrypted data blocks onto the memory of the distributed system.

Implementations of the disclosure may include one or more of the following optional features. In some configurations, when the data block is not stored in the block stash during the download phase, the method includes sending, by the data processing hardware, a real query to the distributed system to download a pair of data buckets from the memory of the distributed system; decrypting, by the data processing hardware, all of the data blocks within the two data buckets; and determining, by the data processing hardware, whether one of the two data buckets includes the data block. Here, each of the data buckets downloaded from the distributed system in response to the real query includes multiple data blocks and a corresponding cryptographic identifier associated with an identifier of the data block. In these configurations, when one of the data buckets includes the data block, the method further includes: removing, by the data processing hardware, the data block from the corresponding data bucket; and discarding, by the data processing hardware, the remaining data blocks from the data buckets.

In some examples, the identifier of the data block includes a string. Executing the read or write operation on the data block during the overwrite phase may also include executing a write operation by updating the data block with a new version of the data block. The probability may be less than (C/N), where C is a storage capacity of the block stash and N is a number of data blocks outsourced by the data processing hardware for storage on the distributed system.

In some implementations, when the current version of the data block is not stored in the block stash during the overwrite phase, the method includes sending, by the data processing hardware, a real query to the distributed system to download a pair of data buckets from the memory of the distributed system. Here, each of the data buckets downloaded from the distributed system in response to the real query includes multiple data blocks and a corresponding cryptographic identifier associated with an identifier of the data block. In this implementation, when the current version of the data block is not stored in the block stash during the overwrite phase, the method also includes: decrypting, by the data processing hardware, all of the data blocks within the data buckets; replacing, by the data processing hardware, a previous version of the data block within one of the data buckets with the current version of the data block; re-encrypting, by the data processing hardware, all of the data blocks including the current version of the data block within the data buckets; and uploading, by the data processing hardware, the data buckets including the re-encrypted data blocks onto the memory of the distributed system.

Yet another aspect of the disclosure provides a method for oblivious access with differential privacy. The method include executing, by data processing hardware of a client device, an instruction to execute a query (q) for a data block stored on a server. The method also includes sending a first download request for K blocks stored on the server, the K blocks excluding the queried data block and sending a second download request for the queried data block and K−1 other blocks. The method further includes receiving a first download sequence for the K blocks of the first download request from the server and receiving a second download sequence for the queried data block and the K−1 other blocks of the second download request from the server.

Implementations of the disclosure may include one or more of the following optional features. In some examples, the server is untrusted and stores a plurality of publically available data blocks that are un-encrypted. The method may include discarding, by the data processing hardware, the K blocks of first download sequence received from the server. Additionally or alternatively, the method may also include discarding, by the data processing hardware, the K−1 other blocks of the second download sequence received from the server. The value for K may be based on a security parameter and an error probability greater than zero.

DETAILED DESCRIPTION

While oblivious random access memory (O-RAM) may conceal client access patterns to client-owned and client-encrypted data stored on untrusted memory, widespread deployment of O-RAM is restricted due the large bandwidth overhead and/or large client storage requirements associated with O-RAM. In many scenarios, security guarantees of O-RAM that ensure that data contents and access patterns remain completely hidden, are too strong. For example, it may be pointless to conceal information about an access pattern that may have been leaked through other channels (e.g., a priori knowledge about the user/client of the data). Thus, if only a small set of queries are in fact sensitive, hiding the entire access sequence is also unnecessary. Implementations herein are directed toward using differentially private access to data blocks stored on untrusted memory in order to achieve exponentially smaller bandwidth overhead by relaxing some unnecessary security requirements. Differentially private access may be used with O-RAM and oblivious storage (OS) for obliviously executing queries for data blocks stored on untrusted memory managed by a service provider. The untrusted memory may induce a storage abstraction overlaid across multiple memory locations of a distributed system (e.g., cloud environment) and a client may store encrypted data blocks across the memory locations. The untrusted memory may also store publically-known data blocks that is not encrypted. In these scenarios, differentially private access may be used with private information retrieval (PIR) to conceal the access patterns of the publically-known and un-encrypted data from the untrusted memory.

Figure 1B:
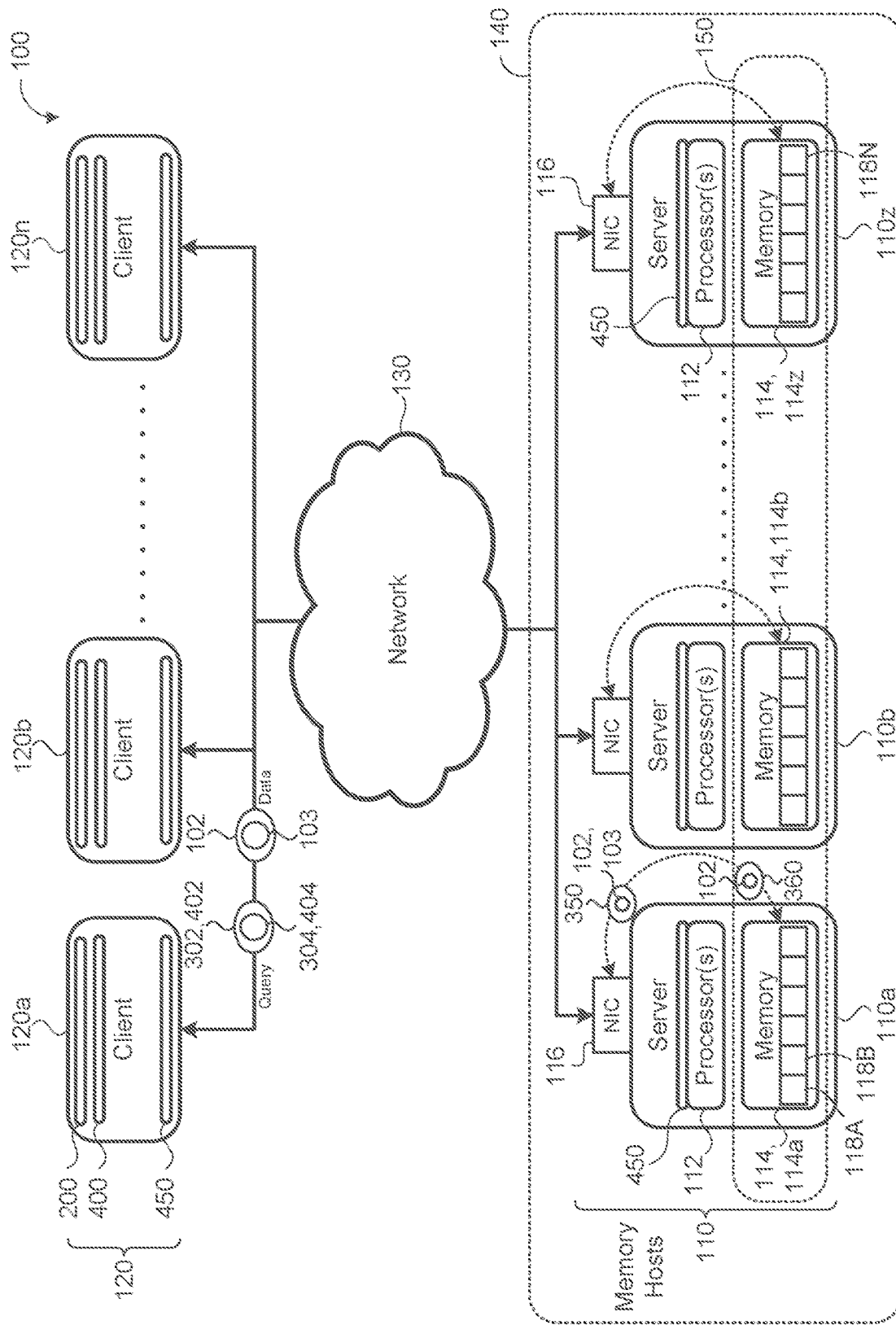
FIG. 1B is a schematic view of an example system for allowing one or more clients to obliviously execute queries for data blocks stored on non-transitory data storage of a distributed storage system.

FIGS. 1A and 1B depict an example system 100 for storing N data blocks (B) 102 owned by a client 104 on a distributed system 140 and using differentially private access to oblivious execute queries for the data blocks (B) 102 to conceal access patterns while preserving search functionalities on the data blocks 102 by the client 104. A client device 120 (e.g., a computer) associated with the client 104 communicates, via a network 130, with the distributed system 140 having a scalable/elastic non-transitory storage abstraction 150. The client device 120 may include associated memory hardware 122 and associated data processing hardware 124. The storage abstraction 150 (e.g., key/value store, file system, data store, etc.) is overlain on storage resources 114 to allow scalable use of the storage resources 114 by one or more client devices 120.

The system 100 may optionally store publically-known and un-encrypted N data blocks 102 across one or more storage resource 114. Thus, the client device 120 may not own the data blocks 102 and the content of the data blocks 102 are available to the public in configurations. However, the use of differentially private access may similarly hide access patterns when the data blocks 102 are retrieved from the one or more storage resource 114.

In some implementations, the distributed system 140 executes a computing device 112 that manages access to the storage abstraction 150. For instance, the client device 120 may encrypt and store the data blocks 102 on the storage abstraction 150, as well as retrieve and decrypt the data blocks 102 from the storage abstraction 150. While the example shown depicts the system 100 having a trusted side associated with the client device 120 in communication, via the network 130, with an untrusted side associated with the distributed system 140, the system 100 may be alternatively implemented on a large intranet having a trusted computing device(s) (CPU) and untrusted data storage. The untrusted side associated with the distributed system 140 or data storage is considered "honest-but-curious", in that the computing device 112 follows the protocol honestly but may perform any probabilistically polynomial time algorithm using information leaked by the distributed system 140 to gain additional insight.

In some implementations, the distributed system 100 includes resources 110, 110a-z. The resources 110 may include hardware resources and software resources. The hardware resources 110 may include computing devices 112 (also referred to as data processing devices and data processing hardware) or non-transitory memory 114 (also referred to as memory hardware and storage resources). The software resources 110 may include software applications, software services, application programming interfaces (APIs) or the like. The software resources 110 may reside in the hardware resources 110. For example, the software resources 110 may be stored in the memory hardware 114 or the hardware resources 110 (e.g., the computing devices 112) may be executing the software resources 110.

A software application (i.e., a software resource 110) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The memory hardware 114, 122 may be physical devices used to store programs (e.g., sequences of instructions) or data (e.g., program state information) on a temporary or permanent basis for use by a computing device 112 and/or a client device 120 (i.e., the data processing hardware 124 of the client device 120). The memory hardware 114, 122 may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), oblivious random access memory (ORAM), dynamic random access memory (DRAM), static random access memory (SRAM), phase change memory (PCM) as well as disks or tapes.

The network 130 may include various types of networks, such as local area network (LAN), wide area network (WAN), and/or the Internet. Although the network 130 may represent a long range network (e.g., Internet or WAN), in some implementations, the network 130 includes a shorter range network, such as a local area network (LAN). In some implementations, the network 130 uses standard communications technologies and/or protocols. Thus, the network 130 can include links using technologies, such as Ethernet, Wireless Fidelity (WiFi) (e.g., 802.11), worldwide interoperability for microwave access (WiMAX), 3G, Long Term Evolution (LTE), digital subscriber line (DSL), asynchronous transfer mode (ATM), InfiniBand, PCI Express Advanced Switching, Bluetooth, Bluetooth Low Energy (BLE), etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of the links can be encrypted using conventional encryption technologies, such as secure sockets layer (SSL), transport layer security (TLS), virtual private networks (VPNs), Internet Protocol security (IPsec), etc. In other examples, the network 130 uses custom and/or dedicated data communications technologies instead of, or in addition to, the ones described above.

The data blocks 102 correspond to atomic units of data and each have size B bytes each. For example, a typical value for B for storage on a distributed system may be 64 KB to 256B. A notation N denotes a total number of the data blocks 102 associated with the client 104 (or associated with the storage resource(s) 114 in private information retrieval) and stored on the storage abstraction 150 using Oblivious Random Access Memory (O-RAM) or Oblivious Storage (OS). Described in greater detail below, OS may use the same framework (i.e., transcript and security definition) as O-RAM except that OS considers a natural extension where the data blocks 102 are identified by unique string identifiers instead of simple index identifiers as used by O-RAM. Thus, N may refer to the capacity of the O-RAM or the OS on the storage abstraction 150. Each of the N data blocks 102 is stored at a corresponding memory location 118, 118A-N (FIG. 1B) of the storage abstraction 150 overlain across the memory hardware 114. In some implementations, the N data blocks 102 are associated with private information retrieval (PIR) storage whereby the N data blocks 102 are stored on one or more storage resources 114 and are un-encrypted and available to the public.

While traditional encryption schemes provide confidentiality, the traditional encryption schemes are ineffective at hiding data access patterns which may reveal very sensitive information to the untrusted distributed system 140. Moreover, the traditional encryption schemes allow the client 104 to search for encrypted data 102 stored on the distributed system 140 only if the client 104 provides plain text access for the data 102 to the distributed system 140. As the client device 120 originates the data 102, the client device 120 is considered trusted.

In some implementations, the client device 120 and the distributed system 140 execute an oblivious permutation routine 450 for oblivious moving the encrypted data blocks 102 around the storage abstraction 150 to completely hide data access patterns (which data blocks 102 were read/written) from the distributed system 140. For instance, the oblivious permutation routine 450 may cause the distributed system 140 to allocate new memory locations 118 of the storage abstraction 150 for storing re-permutated N data blocks 102 arranged in an array, A, and/or organize/divide/partition the storage abstraction 150 into multiple data buckets 350. In some implementations, the oblivious permutation routine 450 organizes the storage abstraction 150 into N data buckets 350 each containing θ(log log N) memory locations 118 such that each data bucket 350 can store both one or more real data blocks 102 and one or more dummy data blocks 103. In these implementations, the storage abstraction 150 includes a total capacity equal to θ(N log log N).

At the trusted side, the client device 120 may iteratively download two data buckets 350 at a time from the distributed system 140 using a pair of pseudorandom functions $F_1$, $F_2$ and corresponding identifiers id and allocates a block stash 370 on the memory hardware 122 while executing the oblivious permutation routine 450. For each data bucket 350 received, the client device 120 decrypts and applies a random permutation on the data blocks 102 within the corresponding data bucket 350 to generate permutated data blocks and determines a corresponding buffer bucket 360 for each permutated data block 102. Additional details executing the oblivious permutation routine for obliviously moving the encrypted data blocks 102 around the storage abstraction 150 can be found in U.S. Patent Application 62/490,804, filed on Apr. 27, 2017, which is hereby incorporated by reference in its entirety. In some implementations, the client device 120 further initializes an oblivious shuffle in the local memory hardware 122 by downloading the data blocks 102 from the pair of buckets 350 and decrypt/re-encrypt the data blocks 102 before shuffling the re-encrypted data blocks 102 accordingly to a new randomly selected permutation using newly selected pseudorandom functions $F'_1$, $F'_2$. Thereafter, the client device 120 uploads the re-permutated data blocks 102 to the corresponding buffer buckets 360 based on the newly selected pseudorandom functions $F'_1$, $F'_2$. The old buckets 350 may be deleted after the shuffle is complete. This oblivious shuffle may occur when the oblivious permutation routine 450 executes on the client device 120 and the distributed system 140. Additional details of obliviously shuffling N data blocks 102 around the storage abstraction 150 can be found in U.S. Patent Application 62/508,523, filed on May 19, 2017, which is hereby incorporated by reference in its entirety.

In some implementations, when the client device 120 needs to access (read/write) an encrypted data block 102 stored on the storage abstraction 150, the data processing hardware 124 at the client device 120 executes an instruction 300, 400 to execute a query (q) for the data block 102. By executing the instruction 300, 400, the client device 120 is able to retrieve the data block 102 without revealing the contents of the data block 102 as well as the sequence of the query (q) executed by the client device 120 to the distributed system 140. The query (q) consists of two phases: (1) a download phase; and (2) an overwrite phase so that the distributed system 140 is unaware whether the corresponding operation is a read or write. Further, execution of the instruction 300, 400 obviates which data blocks 102 were read/written from the distributed system 140. Execution of the instruction 300, 400 requires two roundtrips between the client device 120 and the distributed system 140 when the client device 120 executes the corresponding query (q) for the data block 102. For instance, since each query (q) includes the download phase and the overwrite phase, the contents of an overwrite block associated with a write operation does not depend on the content of a downloaded block during a download phase. Hence, the two blocks can be requested using one round-trip and the second round-trip may be used to upload the overwrite block back to storage abstraction 150.

Referring to FIG. 1B, in some implementations, the distributed storage system 140 includes loosely coupled memory hosts 110, 110a-z (e.g., computers or servers), each having a computing resource 112 (e.g., one or more processors or central processing units (CPUs)) in communication with storage resources 114 (e.g., memory hardware, memory hardware, flash memory, dynamic random access memory (DRAM), phase change memory (PCM), and/or disks) that may be used for caching data. The storage abstraction 150 overlain on the storage resources 114 allows scalable use of the storage resources 114 by one or more client devices 120, 120a-n. The client devices 120 may communicate with the memory hosts 110 through the network 130 (e.g., via remote procedure calls (RPC)).

In some implementations, the distributed storage system 140 is "single-sided," eliminating the need for any server jobs for responding to real and/or fake queries 302,402/304, 404 from client devices 120 to retrieve data blocks 102 and/or dummy data blocks 103 from the storage abstraction 150 when the client device 120 executes instructions 300, 400 to execute queries (q) for data blocks 102. "Single-sided" refers to the method by which most of the request processing on the memory hosts 110 may be done in hardware rather than by software executed on CPUs 112 of the memory hosts 110. Additional concepts and features related to a single-sided distributed caching system can be found in U.S. Pat. No. 9,164,702, which is hereby incorporated by reference in its entirety.

The distributed system 140 may obliviously move data blocks 102 around the storage resources 114 (e.g., memory hardware) of the remote memory hosts 110 (e.g., the storage abstraction 200) and get the data blocks 102 from the remote memory hosts 110 via RPCs or via remote direct memory access (RDMA)-capable network interface controllers (NIC) 116. A network interface controller 116 (also known as a network interface card, network adapter, or LAN adapter) may be a computer hardware component that connects a computing device/resource 112 to the network 130. Both the memory hosts 110a-z and the client device 120 may each have a network interface controller 116 for network communications. The instructions 300, 400 and/or the oblivious permutation routine 450 executing on the physical processor 112 of the hardware resource 110 registers a set of remote direct memory accessible regions/locations 118A-N of the memory 114 with the network interface controller 116. Each memory location 118 is configured to store a corresponding data block 102.

In some implementations, when the client device 120 executes the instruction 300, 400 to execute the query (q) for a data block 102 and determines that the data block 102 is stored locally on the block stash 370 at the memory hardware 122 of the client device 120, the client device 120 retrieves the data block 102 from the block stash 370 and sends a fake query 304, 404 to the NIC 116 for retrieving a random block 102 (or random data buckets 350 including real and/or fake blocks 102, 103) to conceal the retrieval of the data block 102 from the block stash 370 at the local memory hardware 122. The client device 120 may discard the random block 102 downloaded from the fake query 304, 404. On the other hand, if the client device 120 determines that the data block 102 is stored on the storage abstraction 150, the client device 120 may send a real query 302, 402 to the NIC 116 for retrieving the corresponding data block 102 from the storage abstraction 150.

Figure 2A:
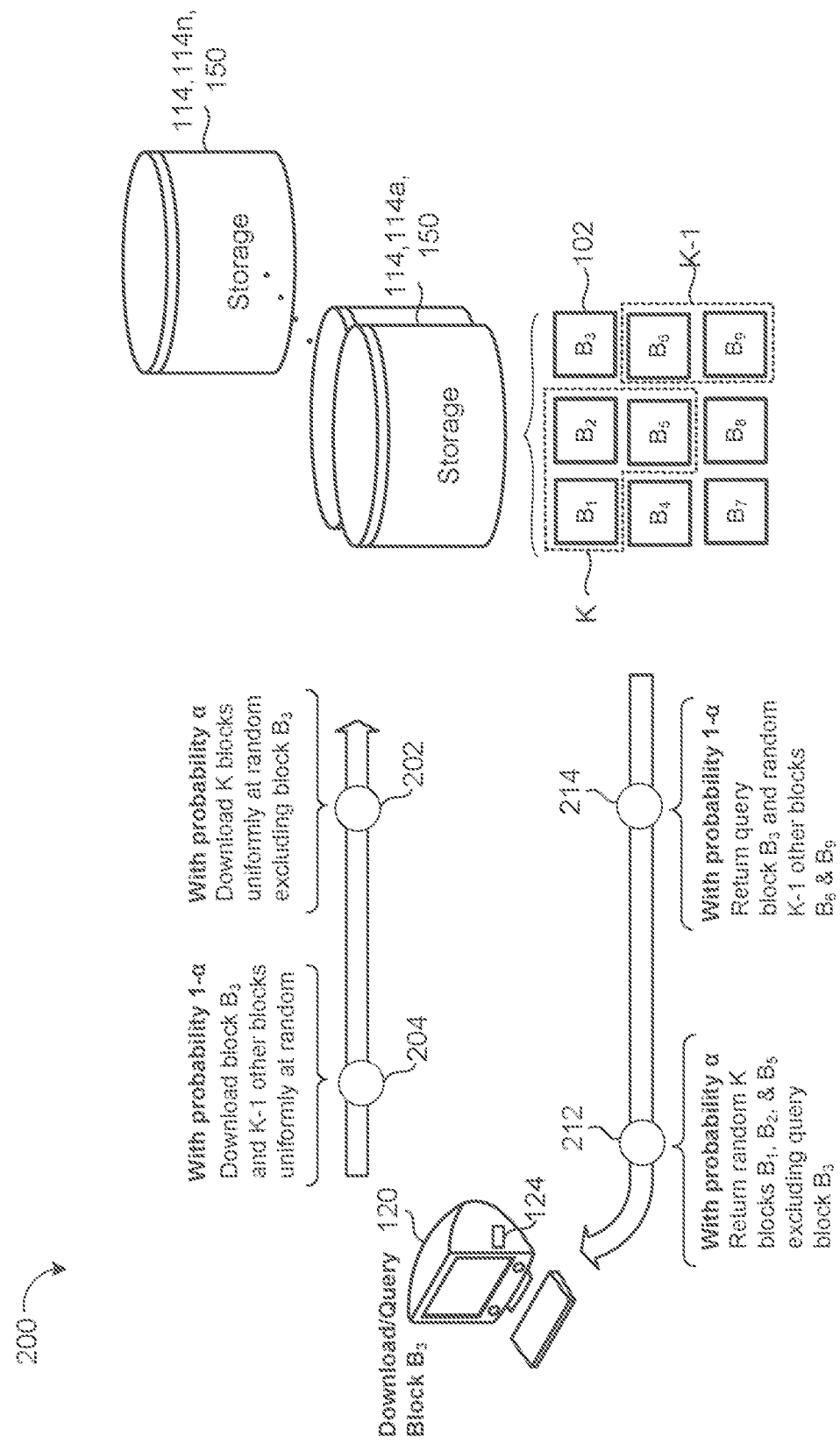
FIGS. 2A and 2B are schematic views of an example differentially private (DP) private information retrieval (PIR) routine for obliviously executing queries stored on non-transitory data storage of a single server or of multiple servers.
Figure 2B:
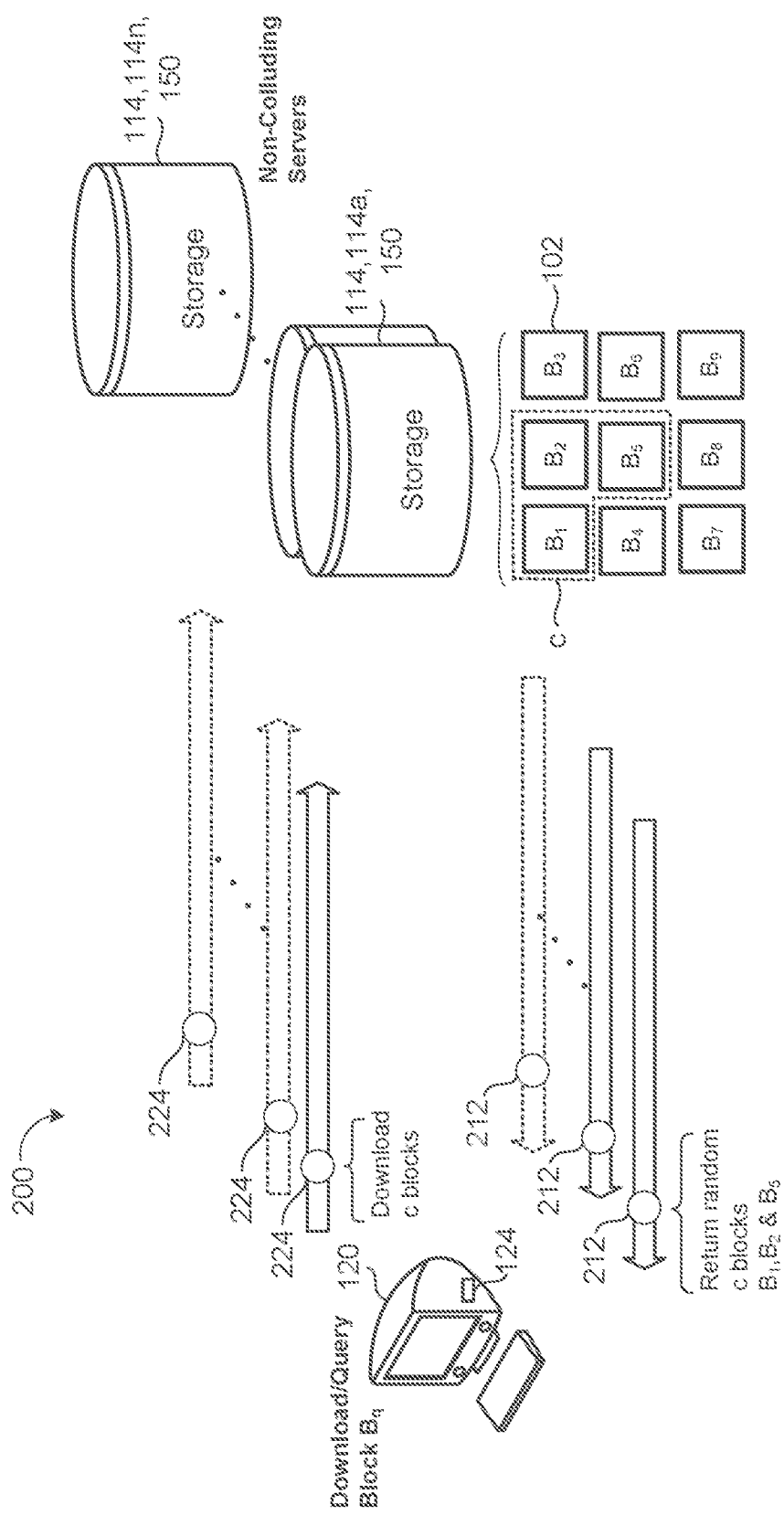

FIGS. 2A and 2B provide an example differentially private-information information retrieval (DP-IR) instruction 200 executing on the client device 120 to execute a download request 202, 204 for a data block 102 stored on one or more colluding storage resources 114 (FIG. 2A) or one of multiple non-colluding storage resources (FIG. 2B). Unlike O-RAM and OS, the contents of the N data blocks 102 are assumed to be known by all parties including any adversaries. In this case, the untrusted server generates the N data blocks before providing access to client devices 120. Typically, PIR client devices 120 are stateless since the data blocks 102 are un-encrypted and their memory locations are publically-available.

For a single server 110 (e.g., single storage resource 114) generating and storing the N data blocks 102, FIG. 2A shows the client device 120 executing the DP-IR instruction 200 to download block $B_3$ 102 from the storage resource 114a. Here, block $B_3$ corresponds to one of nine N blocks $B_1$-$B_9$ stored on the single storage resource 114a. The client device 120 may call out the index i (e.g., i=1, 2, 3 . . . , or 9) associated with the queried block 102. The DP-IR instruction 200 includes differential privacy having a security parameter, E, for a constant error probability, a, that is asymptotically tight to a lower bound. The security parameter E may be greater than or equal to zero and the error probability α may be greater than zero. In order to conceal the access pattern for the downloaded block $B_3$, the DP PIR instruction 200 disguises real queries by executing a download request 202 with probability α for K blocks excluding block $B_3$ and another download request 204 with probability 1-α for the block $B_3$ and K-1 other blocks. Hence, each download request 202, 204 is requesting exactly K blocks of bandwidth among the N data blocks 102 stored on the storage resource 114. The download requests 202, 204 may occur in any order to conceal the fact that block $B_3$ is the actual queried-for block $B_3$ the client device 120 wants to download. The value of K is based on a function of the security parameter E and the error probability α. For instance, K may be expressed as follows.

$$K = K(\varepsilon, \alpha) = \frac{(1-\alpha)N}{\alpha(e^\varepsilon - 1)} \quad (1)$$

In the single-server example, the client device 120 receives a first download sequence 212 associated with error probability α returning the K blocks $B_1$, $B_2$, $B_5$ excluding the queried-for block $B_3$ and a second download sequence 214 associated with the error probability 1-α for the block $B_3$ and the K-1 other blocks $B_6$, $B_9$. The second download sequence 214 may be received by the client device 120 before or after receiving the first download sequence 212. The K blocks $B_1$, $B_2$, $B_5$ returned in the first download sequence 212 associated error probability α and the K-1 other blocks $B_6$, $B_9$ returned in the second download sequence 214 associated with error probability 1-α may each be uniformly selected at random by the DP-IR instruction 200 executing on the client device 120.

In some implementations, an entity or organization operating multiple servers 110, 110a-n (e.g., two more storage resources 114, 114a-n each associated with a respective server 110) includes one of the servers corrupting a fraction t of the servers. In this situation to conceal the access patterns by the client device 120 when downloading data blocks 102 from the various storage resources 114a-n colluding with one another, FIG. 2A shows the client device 120 executing the DP-IR instruction 200 to download block $B_3$ (or another block $B_i$) by sending the download requests 202, 204 to a uniformly at random chosen storage resource 114 instead of splitting up and evenly requesting the block $B_3$ from all of the colluding storage resources 114a-n. Accordingly, in order to conceal the access pattern for the downloaded block $B_3$ in the multiple colluding server setting, the DP PIR instruction 200 disguises real queries sent to the uniformly at random chosen storage resource 114 by executing the download request 202 with probability α for K blocks excluding block $B_3$ and the other download request 204 with probability 1-α for the block $B_3$ and K-1 other blocks. In response to receiving each of the download requests 202, 204 from the client device, the uniformly at random chosen storage resource 114 returns the corresponding download sequence 212 associated with error probability α for the K blocks $B_1$, $B_2$, $B_5$ excluding the queried-for block $B_3$ and the corresponding download sequence 214 associated with the error probability 1-α for the block $B_3$ and the K-1 other blocks $B_6$, $B_9$ in the same manner as discussed above with respect to the single server setting.

Referring to FIG. 2B, the client device 120 queries for a data block $B_q$ 102 from one of multiple non-colluding servers 110 (e.g., two or more storage resources 114) that are mutually distrusting, and therefore do no share information with one another. For instance, the non-colluding servers 110 may be owned by separate entities accessible to the client devices 120 but not sharing information with one another due to contractual obligations or other reasons. Each non-colluding server 110 may be associated with a non-interacting adversary such that each server 110 may monitor all memory accesses patterns performed on its corresponding storage resource 114. In order to conceal the access pattern for the downloaded block $B_q$, the DP PIR instruction 200 disguises real queries by executing a corresponding download request 224 sent to each of the non-colluding storage resources 114 that requests to download exactly c random blocks of bandwidth from each storage resource 114. For the storage resource 114 storing the queried-for block $B_q$, the corresponding download request 224 is for the queried-for block $B_q$ and c-1 other blocks. For the remaining storage resources 114, each corresponding download request 224 is for c blocks excluding the queried-for block $B_q$. The value of c for each non-colluding storage resource 114 is based a security parameter ε, the total number of non-colluding servers D, and the corresponding number of N data blocks 102 stored on each storage resource 114. For instance, for each non-colluding storage resource 114, c may be expressed as follows.

$$C = \frac{N}{e^{\varepsilon}(D-1)} \quad (2)$$

In some implementations, O-RAM allows the client device 120 to store client-owned and client-encrypted data blocks 102 privately on corresponding memory locations 118 across the storage abstraction 150 of the distributed system 140. By contrast to the DP-IR of examples FIGS. 2A and 2B, the data blocks 102 stored in O-RAM are encrypted by the client device 120 using private keys and the memory location 118 associated with each data block 102 is hidden from the untrusted distributed system 140. FIGS. 3A-3D show an example differentially private-oblivious random access memory (DP-ORAM) instruction 300 executing on the client device 120 to execute a query (q) to access (read/write) an encrypted data block 102 stored on the storage abstraction 150 without revealing the contents of the data block 102 as well as the sequence of the query (q) executed by the client device 120 to the distributed system 140. The query (q) consists of two phases: (1) a download phase; and (2) an overwrite phase so that the distributed system 140 is unaware whether the corresponding operation is a read or write as well as revealing a miss when a queried-for data block $B_i$ does not exist. The DP-ORAM instruction 300 executing on the client device 120 (e.g., on the data processing hardware 124) may first generate private keys K, $K_1$, $K_2$ of length k using an encryption module 305, initialize an array A on the storage abstraction 150 of N empty block slots (e.g., empty memory locations 118), and initialize the block stash 370 on the memory hardware 122 of the client device 120. Each empty block slot of the array A may include a corresponding index A. Each empty block slot may optionally be initially filled with a dummy block (e.g., a block with encryption equal to zero).

In some examples, the client device 120 and the distributed system 140 execute the oblivious permutation routine 450 to cause the distributed system 140 to allocate new memory locations 118 of the storage abstraction 150 for storing permutated or re-permutated data blocks 102 and organize/divide/partition the storage abstraction 150 into multiple M data buckets 350, 350a-n. Each data bucket 350 may store a specified number of the N data blocks 102. In some examples, the data blocks 102 are randomly assigned to each data bucket 350 by pseudorandom permutations 7C performed at the client device 120 during a previous oblivious permutation routine 450 so that the division of the storage abstraction 150 into the M data buckets 350 is obscure/oblivious to the untrusted distributed system 140. The smaller data buckets 350 subdivide the O-RAM of the storage abstraction 150 to increase bandwidth when the distributed system 140 and the client device 120 are performing permutation operations during execution of the oblivious permutation routine 450 and the instruction 300.

The number of M data buckets 350 initialized at the distributed system 140 is tunable based on security and/or bandwidth requirements.

The block stash 370 occupies a space/size/capacity equal to C on the memory hardware 122 of the client device 120 and each data block 102 has a probability p of being stored in the block stash 370 (in addition to the storage abstraction 150). The capacity C of the block stash 370 is tunable based on security and/or bandwidth requirements. For instance, increasing the capacity C of the block stash 370 increases security at the cost of increased bandwidth. The probability p of a data block being stored in block stash 370 may be expressed as follows.

$$p < \frac{C}{N} \quad (3)$$

The DP-ORAM instruction 300 further causes the client device 120 to encrypt each data block 102 using the private keys K and iteratively upload each encrypted data block $B_i$ 102 to a corresponding randomly selected empty block slot Ai on the storage abstraction 150 based on a permutation π so that the actual location of each encrypted data block 102 is hidden from the distributed system 140. Moreover, as the data blocks 102 are encrypted on the trusted side by the client device 120 using client-owned private keys K, the contents of the N data blocks 102 stored on the storage abstraction 150 are also unknown to the distributed system 150. The client device 120 may simply access a corresponding data block 102 stored on the storage abstraction 150 by applying the permutation π along with a corresponding index i associated with the requested data block 102.

Figure 3A:
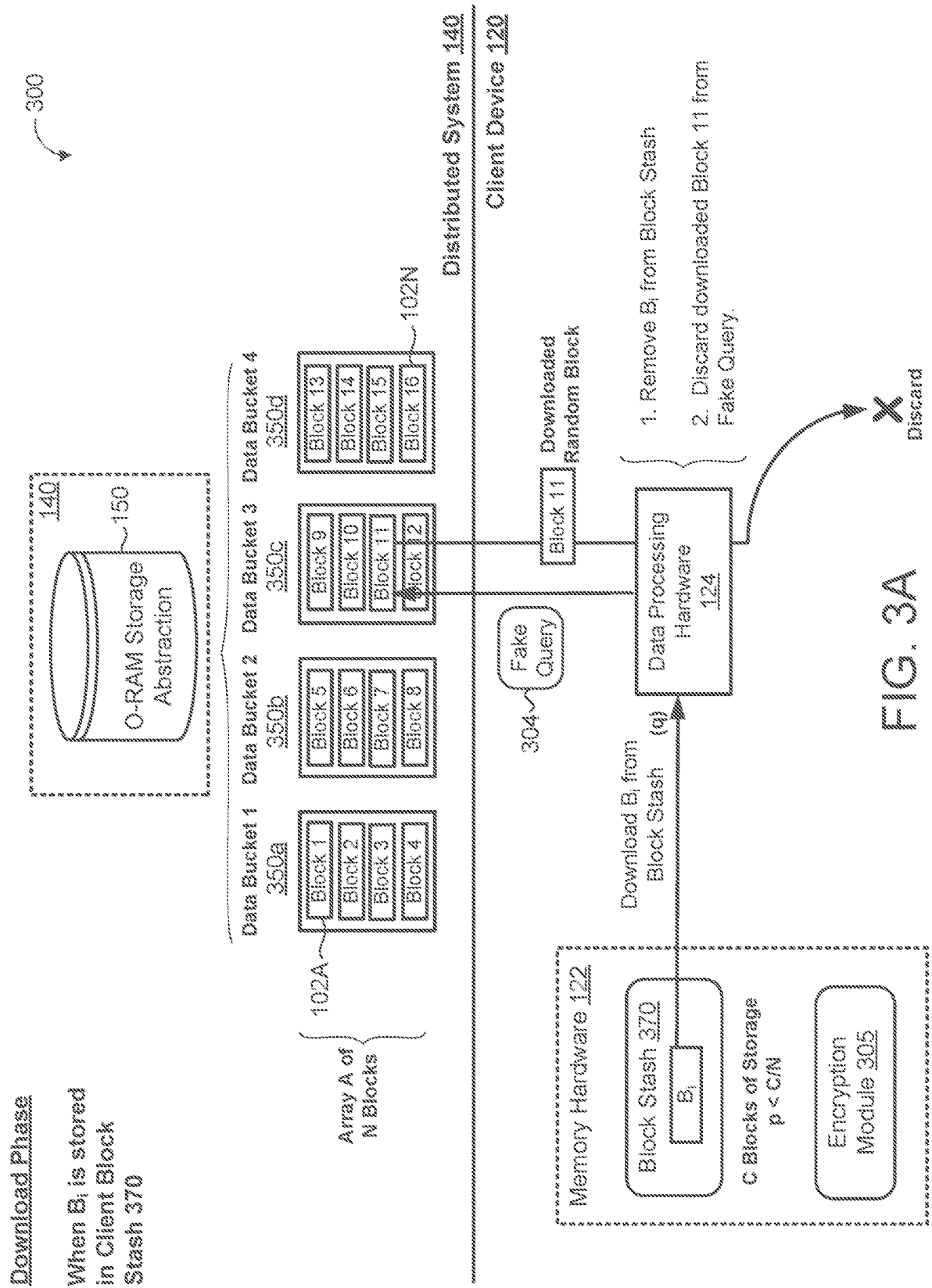
FIGS. 3A-3D are schematic views of an example DP oblivious random access memory (O-RAM) routine for obliviously executing queries stored on non-transitory data storage of a distributed system.

Referring to FIG. 3A, the data processing hardware 124 executes the query (q) for a data block ($B_i$) 102 during the download phase when the data block ($B_i$) 102 is stored in the block stash 370 on the memory hardware 122 of the client device 120. $B_i$ may correspond to any of the N data blocks 1-16 encrypted and stored on the array A of the storage abstraction 150. Since the data block $B_i$ 102 is stored in the block stash 370 with probability p, the data processing hardware 124 removes the requested data block ($B_i$) 102 from the block stash 370 and sends a fake query 304 to the untrusted distributed system 140 to download some random data block 102 stored on the storage abstraction 150 to obfuscate the retrieval of the data block ($B_i$) from the block stash 370. In the example shown, the fake query 304 randomly selects and downloads Block 11 from the third data bucket 350c of the array A of N blocks 102 stored on the storage abstraction 150. Here, the fake query 304 requests A[j] from the storage abstraction 150, with j (e.g., j is equal "11" in the example shown) chosen uniformly at random. Upon receiving the downloaded data block (e.g., Block 11) from the fake query 304, the data processing hardware 124 may simply discard the data block 102 since the client device 120 is merely downloading the block at random to obfuscate the actual retrieval of the data block ($B_i$) from the block stash 370. Thus, the untrusted distributed system 140 is unaware whether or not the retrieved block (e.g., Block 11) is downloaded in response to a real query 302 or the fake query 304. The data processing hardware 124 may execute a read operation or a write operation on the data block ($B_i$) retrieved from the block stash 370 and one of store the current version of the data block ($B_i$) in the block stash 370 with probability p or in the storage abstraction 150 during the overwrite phase.

Figure 3B:
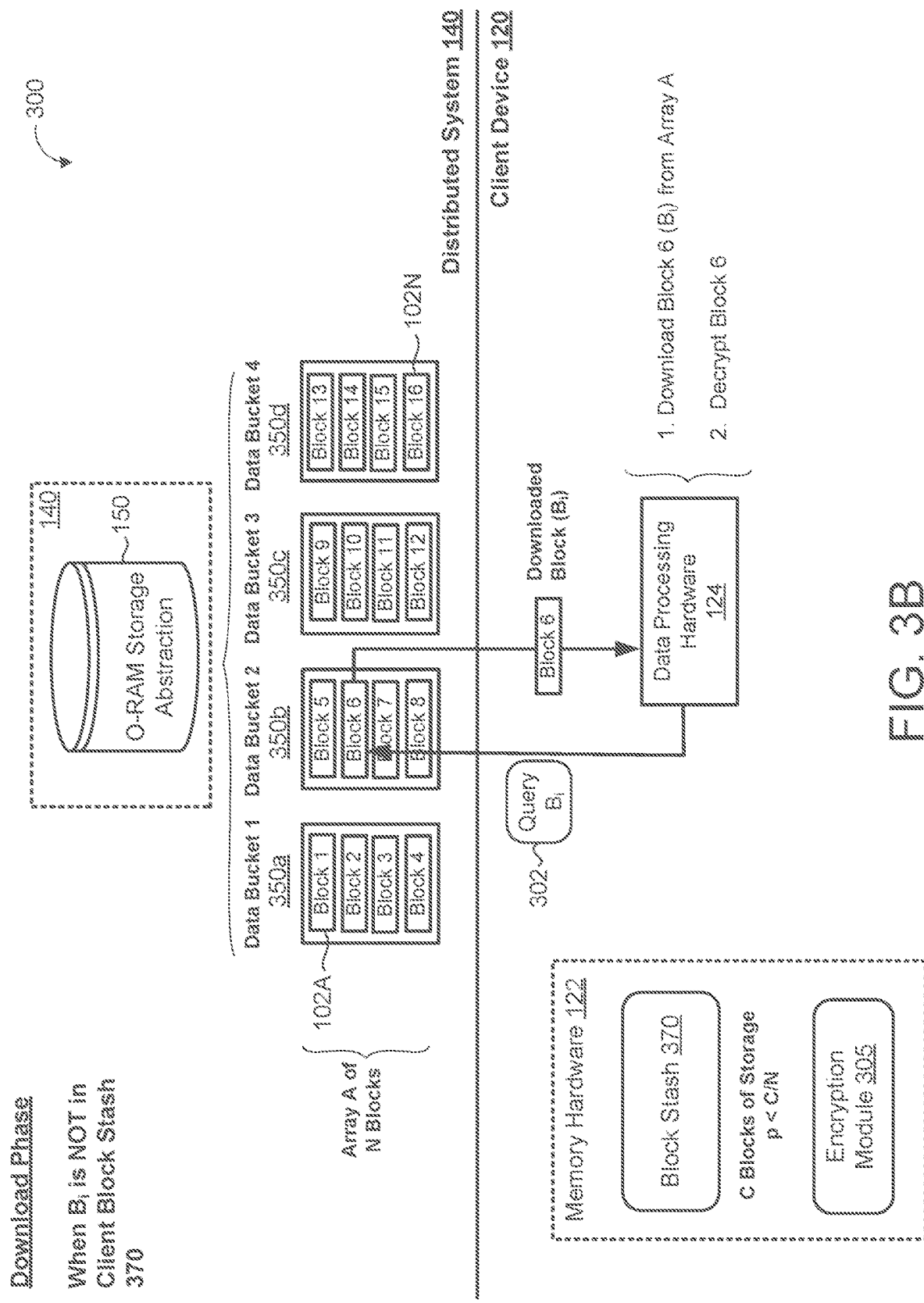

On the other hand, FIG. 3B shows the data processing hardware 124 executing the query (q) for the data block ($B_i$) 102 during the download phase when the data block ($B_i$) is not stored locally in the block stash 370 on the memory hardware 122 of the client device 120. Since the data block $B_i$ 102 is not stored in the block stash 370, the data processing hardware 124 sends a real query 302 to the untrusted distributed system 140 to download the data block $B_i$ stored on the storage abstraction 150. In the example shown, $B_i$ corresponds to block 6 in the second data bucket 350b of the storage abstraction 150. Here, the real query 302 requests A[i] from the storage abstraction 150, with i (e.g., i is equal to "6" in the example shown) corresponding to the index/identifier of the data block ($B_i$) 102 the client device 120 wants to access. In response to retrieving/downloading the data block $B_i$ 102 from the real query 302, the data processing hardware 124 decrypts the block $B_i$. For instance, the data processing hardware 124 may access the private keys K stored locally on the encryption module 305 to decrypt the contents of block 6. The client device 120 may hold (e.g., in memory hardware 122) the retrieved block $B_i$ (e.g., block 6).

Figure 3C:
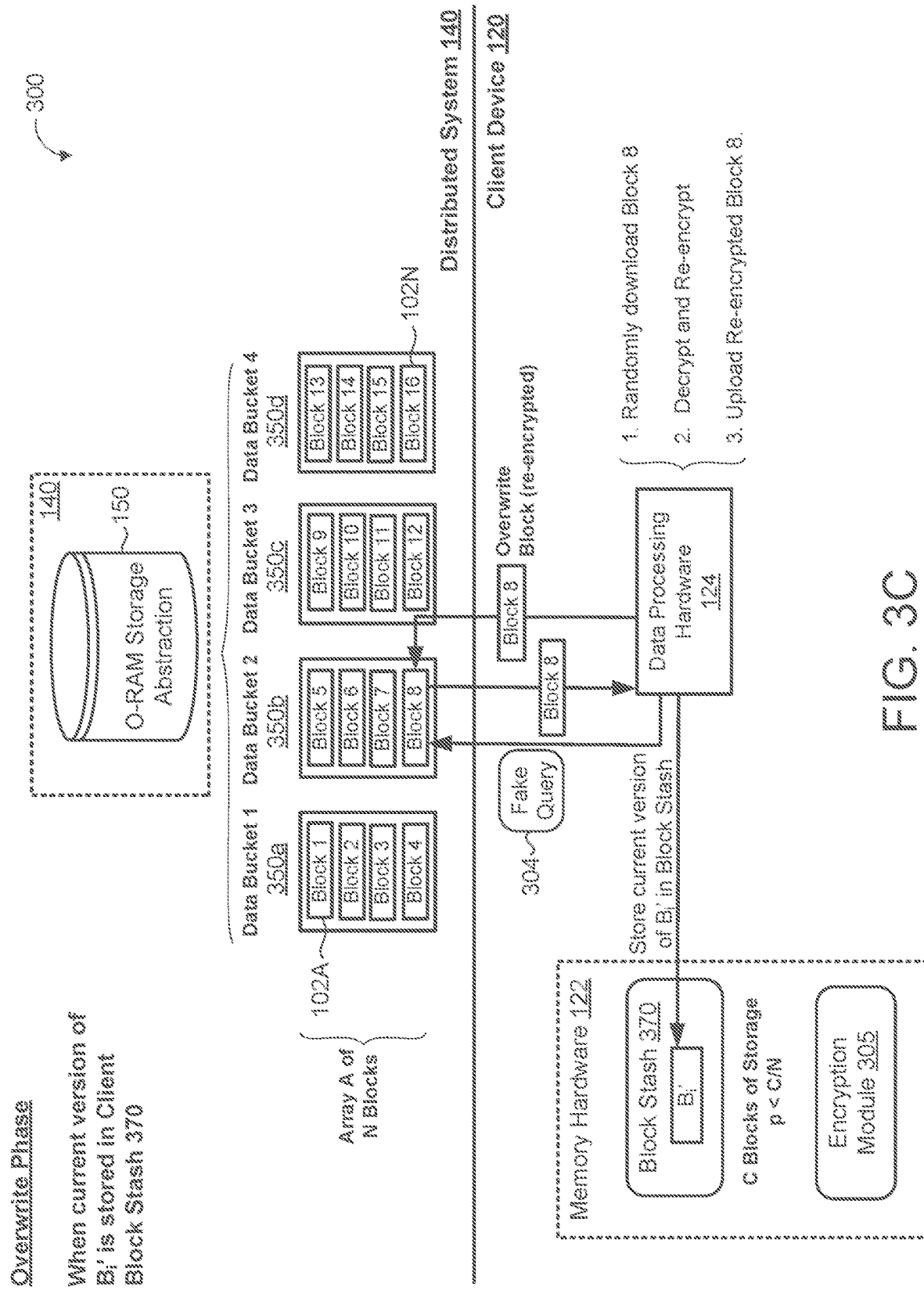

Referring to FIG. 3C, the data processing hardware 124 stores a current version of a data block ($B_i'$) in the block stash 370 with probability p on the memory hardware 122 of the client device 120 during an overwrite phase. The overwrite phase follows a corresponding download phase in which the previous version of the data block ($B_i$) was retrieved either from the block stash 370 (FIG. 3A) or from the storage abstraction 150 (FIG. 3B). In some examples, the client device 120 executes a write operation on the data block ($B_i$) retrieved during the download phase to update the data block with a new version ($B_i'$). As used herein, updating the previous version of $B_i$ with the new version Be may include replacing and discarding the previous version $B_i$ with the new version Be. In these examples, the updated new version ($B_i'$) is stored on in the block stash 370 with probability p during the overwrite phase. In other examples, the client device 120 simply executes a read operation on the data block ($B_i$) retrieved during the download phase. In these examples, the current version stored in the block stash 370 is unchanged from the version retrieved during the download phase.

In order to obfuscate the storing of the current version of the data block ($B_i'$) in the block stash 370 with probability p from the untrusted distributed system 140, the data processing hardware 124 sends another fake query 304 to the untrusted distributed system 140 to download some random data block 102 stored on the storage abstraction 150. In the example shown, the fake query 304 randomly selects and downloads Block 8 from the second data bucket 350b of the array A of N blocks 102 stored on the storage abstraction 150. Here, the fake query 304 requests A[j] from the storage abstraction 150, with j (e.g., j is equal "8" in the example shown) chosen uniformly at random. Upon receiving downloaded data block (e.g., Block 8) from the fake query 304, the data processing hardware 124 decrypts and re-encrypts the block with random freshness and then uploads the re-encrypted data block (e.g., Block 8) back onto the storage abstraction 150 of the distributed system 140. Here, the data processing hardware 124 simply re-encrypts the data block (e.g., Block 8) without changing the contents so that the distributed system 140 is unaware whether or not block was uploaded in response to a fake query 304 or a real query 302 for read/write access. Put another way, the data processing hardware 124 has no way of knowing whether the re-encrypted data block 102 includes updated content as a result of an overwrite or whether the content is unchanged.

Figure 3D:
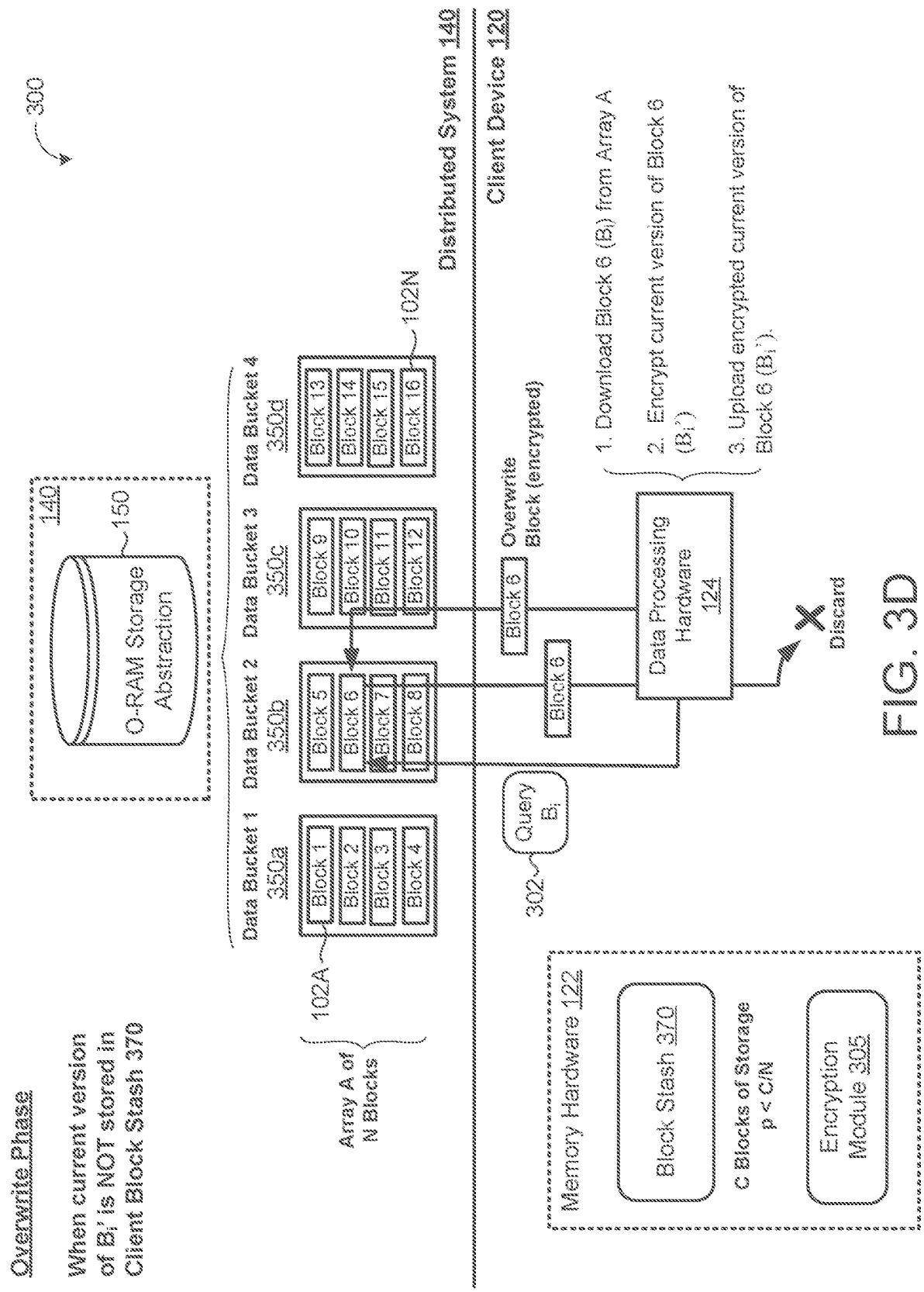

On the other hand, when the current version of a data block ($B_i'$) is not stored in the block stash 370, FIG. 3D shows the client device 120 holding the current version of the data block ($B_i'$) (e.g., in the memory hardware 122) while the data processing hardware 124 sends a real query 302 to the untrusted distributed system 140 to retrieve the corresponding data block ($B_i$) (e.g., Block 6) from the storage abstraction 150. Thereafter, the data processing hardware 124 encrypts and uploads the current version of the data block ($B_i'$) to the distributed system 140 for storage on the storage abstraction 150 and discards the previous version of the corresponding data block ($B_i$) retrieved from the real query 302. In some examples, the current version of the data block ($B_i'$) corresponds to a new version of Block 6 updated by the client device 120 after executing a write operation on the previous version of data block ($B_i$) retrieved during the download phase. In other examples, when the client device 120 only executes a read operation on the data block ($B_i$) retrieved during the download phase, the current version of the data block ($B_i'$) (e.g., Block 6) uploaded to the distributed system 140 may remain unchanged from the corresponding discarded data block $B_i$ except with a freshly computed ciphertext (e.g., a different encryption). Thus, the untrusted distributed system 140 is unaware whether or not the contents of the uploaded current version of data block ($B_i'$) were changed since the client device 120 freshly encrypted the data block ($B_i'$) locally using private keys.

Whereas the O-RAM construction of FIGS. 3A-3D requires each of the N data blocks 102 outsourced by the client 104 to have a unique block identifier i, the oblivious storage (OS) construction allows the data blocks 102 to be identified by strings. Moreover, OS protocols must handle operations (read/write) that refer to identifiers not corresponding to any currently stored block so that an adversary cannot learn whether operations refer to currently stored data blocks 102 on the storage abstraction 150 or non-existing data blocks (i.e., block misses). In some implementations, the DP-ORAM construction/protocol converts to the DP-OS construction/protocol by storing a position map on the client device 120 (e.g., in the memory hardware 122) that assigns a unique index from [N] to each of the N blocks. Here, the position map translates each block identifier to a corresponding index to allow the rest of a query to follow exactly as the previously discussed DP-ORAM. These implementations, however, can be impractical due to a large amount of client-side storage required to store the position map. To alleviate the client from having to store a one-to-one position map of block identifiers (e.g., strings) to corresponding indexes, implementations herein are directed toward using pseudorandom functions (PRFs) to translate block identifiers to indexes from a small domain. As PRFs require storage of a single key, the storage requirements for the client are significantly reduced compared to storing a position map.

Figure 4A:
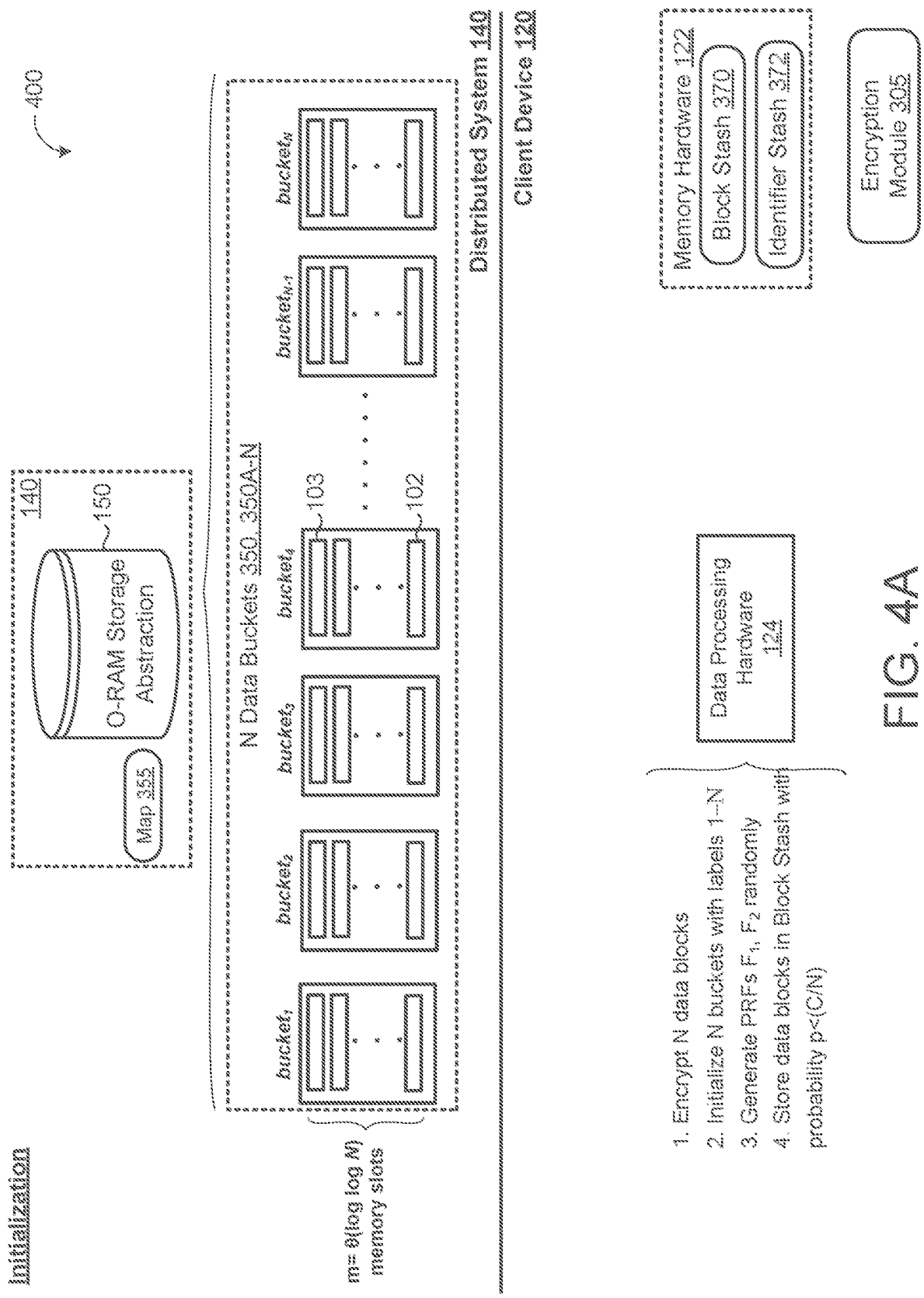
Figure 4C:
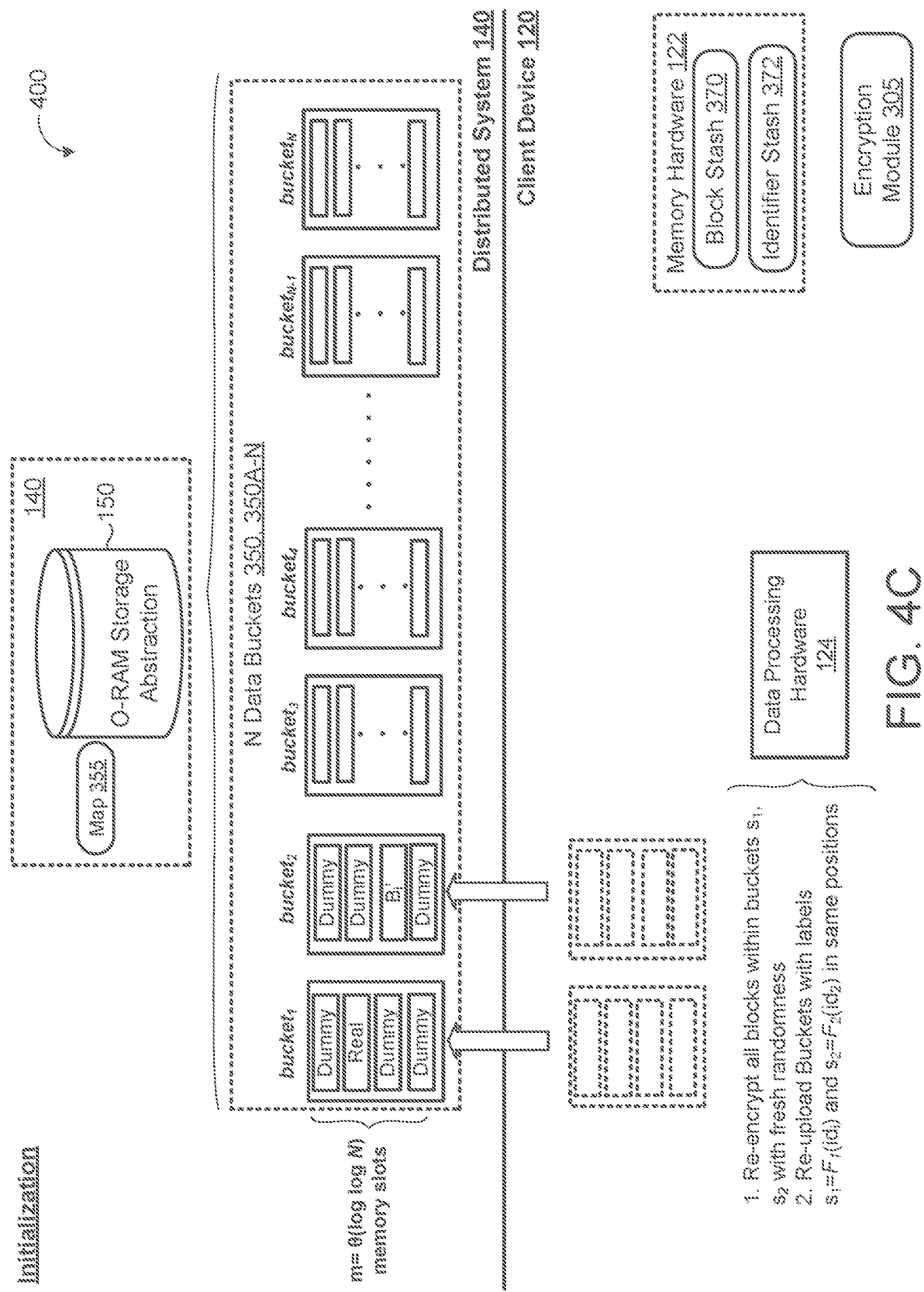

FIGS. 4A-4C show an example differentially private-oblivious storage (DP-OS) instruction 400 executing on the client device 120 to initialize the client device 120 and the distributed system 140 for storing the N data blocks 102 in encrypted form on the storage abstraction 150. FIGS. 5A-5D show the client device 120 executing the DP-OS instruction 400 to execute a query (q) to access (read/write) one of the encrypted data blocks 102 stored on the storage abstraction 150 without revealing the contents of the data block 102 as well as the sequence of the query (q) executed by the client device 120 to the distributed system 140.

Referring to FIG. 4A, execution of the DP-OS instruction 400 by the data processing hardware 124 causes the client device 120 to encrypt each of the N data blocks 102 using one or more private keys obtained from the encryption module 305, initialize the block stash 370 on the memory hardware 122 of the client device 120, and store a sub-set of the encrypted data blocks 102 in the block stash 370 with probability p. The probability p may be expressed using EQ. 3 discussed above. As with ORAM, the block stash 370 at the client device 120 has a capacity of O(C) blocks of storage which may be tunable based on security and bandwidth requirements. The client device 120 (e.g., the data processing hardware 124), when executing the instruction 400, additionally initializes an identifier stash 372 for storing the unique string identifiers id corresponding to each data block 102 stored in the block stash 370.

Each data block 102 includes a corresponding identifier id expressed as a string. During initialization of the DP-OS, the instruction 400 further causes the client device 120 to generate PRFs $F_1$, $F_2$ randomly while the distributed system 140 initializes N buckets 350, 350A-N with labels 1N each with exactly m memory slots for storing corresponding encrypted blocks 102, 103. In the example shown, the number of memory slots m for each bucket 350 is expressed as follows.

$$m = \theta(\log \log N) \quad (4)$$

Accordingly, each memory slot m in a corresponding bucket 350 stores a real data block 102 in encrypted form or a dummy data block 103 in encrypted form. When the N buckets 350 are initialized, each bucket 350 may be initially filled with dummy blocks 103. Metadata and contents of each block 102, 103 will be stored together and each block 102, 103 may include a corresponding tag indicating whether the block is real or fake (i.e., a dummy). The distributed system 140 may store a position map 355 of N pairs of bucket identifiers and denote PosMap[i] as the i-th pair.

The client device 120 is further configured to store the encryption key(s) for encrypting/decrypting the data blocks 102 as well as the PRFs $F_1$, $F_2$ that each require the storage of additional keys $K_1$, $K_2$. For convenience, instead of using $F_1(K_1,x)$ and $F_2(K_2,x)$ the key parameter may be dropped. As will become apparent, the use of the PRFs $F_1$, $F_2$ generated by the client device 120 and stored thereon ensure that a data block $B_i$ with identifier $id_i$ will always be in one of two buckets labelled $F_1(id_i)$ and $F_2(id_i)$ or stored in the block stash 370. As used herein, $F(id_i)$ refers to the pair $(F_1(id_i), F_2(id_i))$ for convenience.

After encrypting the blocks, initializing the N buckets 350A-N, and generating the PRFs $F_1$, $F_2$ at random, the instruction 400 causes the data processing hardware 124 to iterate through each of the N data blocks 102 for obliviously storage on the storage abstraction 150 of the distributed system 140. For a current iteration corresponding to placement of data block $(B_i)$, FIG. 4B shows the data processing hardware 124 using the PRFs $F_1$, $F_2$ to return/download a pair of data buckets 350 with indices $s_1=F_1(id_i)$ and $s_2=F_2(id_i)$ and then decrypting all of the blocks 102, 103 within the downloaded data buckets $s_1$, $s_2$ to determine which of the two buckets is the least loaded. As used herein, a least loaded bucket refers to the data bucket having the least amount of real data blocks 102. In the example shown, the data bucket $s_2$ is least loaded because the data bucket $s_1$ includes a greater number real data blocks 102 (e.g., data bucket $s_1$ includes one real data block 102 and data bucket $s_2$ includes zero real data blocks 102). Accordingly, the data processing hardware 124 replaces one of the dummy blocks 103 from the least loaded bucket $s_2$ with the data block $(B_i)$ of the current iteration. The replaced dummy block 103 may be discarded. If, on the other hand, each of the downloaded data buckets $s_1$, $s_2$ include an equal number of dummy blocks 103, the client device 120 may randomly choose either bucket for input of the data block $(B_i)$ 102.

In some scenarios, and particularly in later iterations as the data buckets 350 are becoming full of real data blocks 102, the two buckets $s_1=F_1(id_i)$ and $s_2=F_2(id_i)$ for a present iteration may not include any dummy blocks 103, thereby rendering the buckets completely full and equally loaded with real data blocks 102. In these scenarios, the instruction 400 will simply fail and terminate such that two new buckets will be downloaded to identify a least-loaded bucket for inputting the data block (Bi) presently being processed.

FIG. 4C shows the data processing hardware 124 re-encrypting all of the blocks 102, 103 within the downloaded buckets $s_1$, $s_2$ with fresh randomness and then re-uploading the buckets $s_1$, $s_2$ back to the distributed system 140 at the same positions within the storage abstraction 150. With probability p, $B_i$ may be stored in the block stash 370. For the remaining probability (i.e., 1−(C/N)), $B_i$ is discarded. The distributed system 140 may further sets the position map PosMap[i] equal to $F(id_i)$ with $F(id_i)$ referring to the pair $(F_1(id_i), F_2(id_i))$.

Figure 5A:
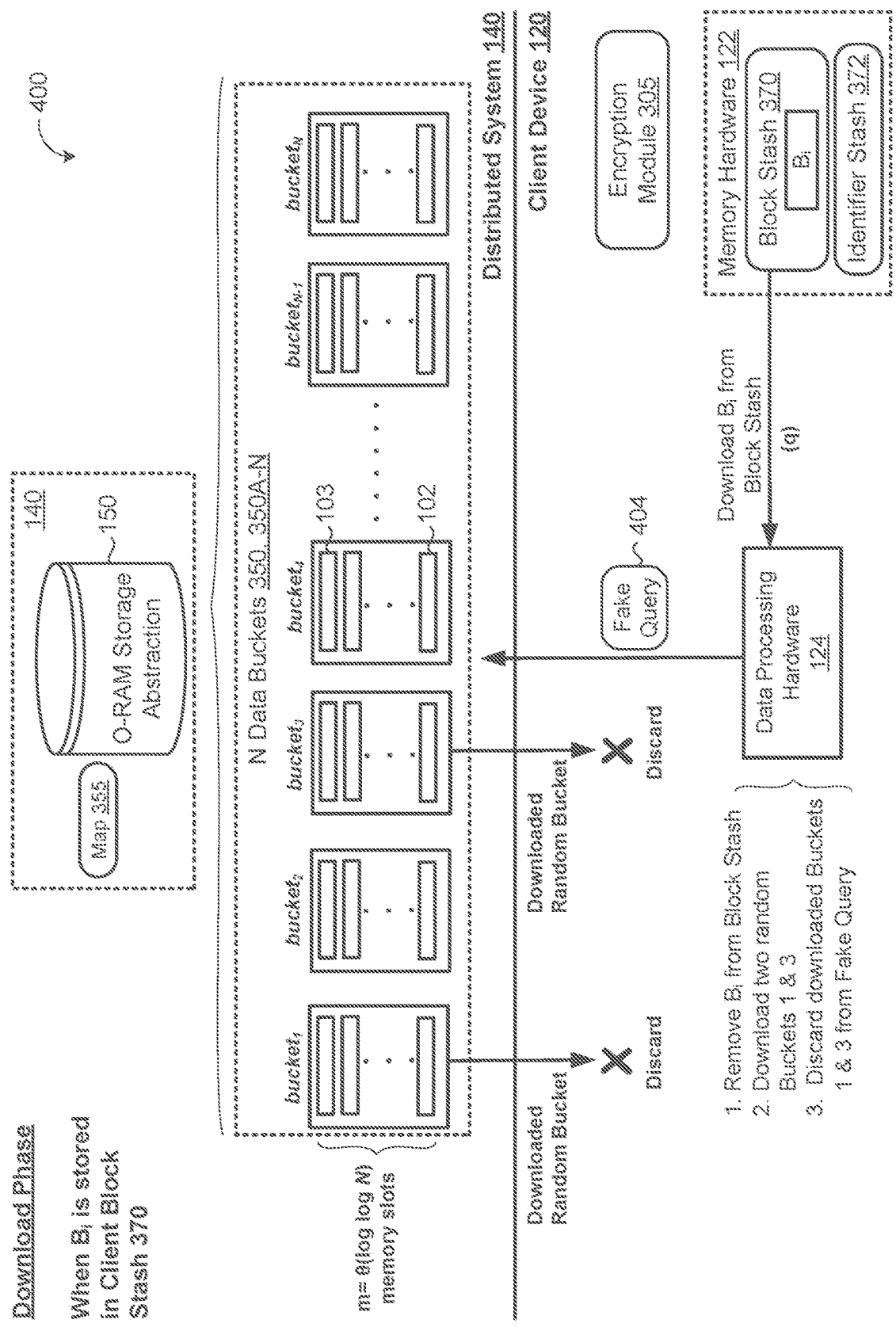
FIGS. 5A-5D are schematic views of an example DP oblivious storage instruction executing on a client device to execute a query for a data block.

After initializing the DP-OS by obliviously storing the N data blocks 102 in encrypted form on the storage abstraction 150 and storing the subset of data blocks 102 in the block stash 370 with probability p, FIG. 5A shows the data processing hardware 124 executing the instruction 400 to execute the query (q) for a data block $(B_i)$ 102 during the download phase when the data block $(B_i)$ 102 is stored in the block stash 370 on the memory hardware 122 of the client device 120. The query (q) includes the identifier id for the block $B_i$ as well as the operation (read/write) for the block. A new block representing a current version may also be included with the query (q) when the operation is a write operation. Here, the data processing hardware 124 queries the block stash 370 to determine the data block $B_i$ 102 is stored therein or the data processing hardware 124 queries the identifier stash 372 to locate the corresponding identifier id (e.g., string) associated with the data block $B_i$ 102. The data processing hardware 124 removes the data block $B_i$ 102 from the block stash 370. Since the data block $B_i$ 102 is stored in the block stash 370 (and/or the id is stored in the identifier stash 372) with probability p, the data processing hardware 124 sends a fake query 404 to the untrusted distributed system 140 to download two random data buckets 350 stored on the storage abstraction 150 to obfuscate the retrieval of the data block $(B_i)$ from the block stash 370. In the example shown, the fake query 404 randomly downloads $bucket_1$ and $bucket_3$. The client device 120 may simply discard the two randomly downloaded buckets 350 (e.g., $bucket_1$ and $bucket_3$) and their respective contents.

Figure 5B:
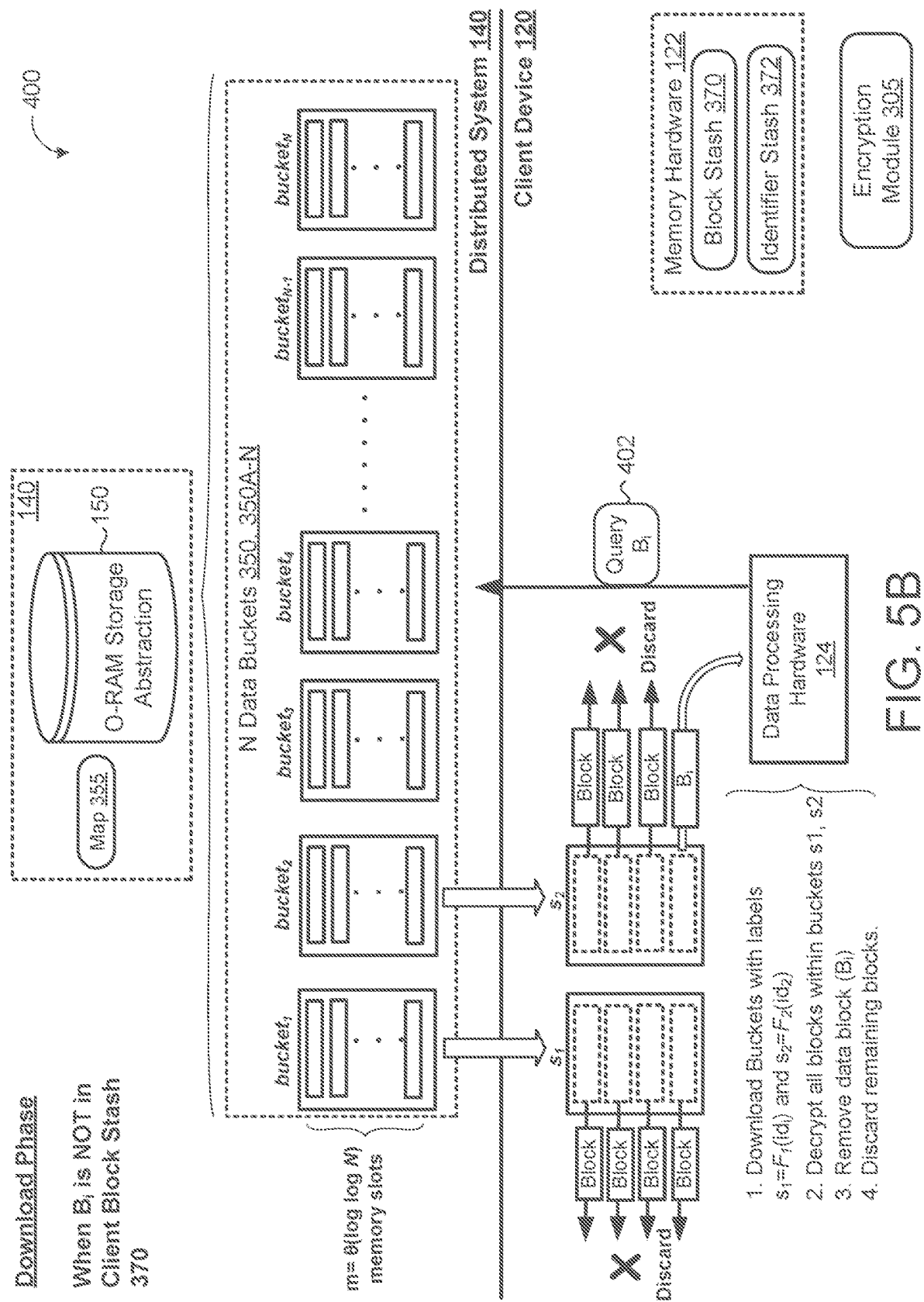

On the other hand, FIG. 5B shows the data processing hardware 124 executing the query (q) for the data block $(B_i)$ 102 during the download phase when neither the data block $(B_i)$ is stored in the local block stash 370 nor the corresponding identifier id is in identifier stash 372 of the client device 120. Since the data block $B_i$ 102 is not stored in the block stash 370 (nor is the identifier id in the identifier stash 372), the data processing hardware 124 sends a real query 402 to the untrusted distributed system 140 to download the pair of data buckets 350 with indices $s_1=F_1(id_i)$ and $s_2=F_2(id_i)$ and then decrypts all of the blocks 102, 103 within the downloaded data buckets $s_1$, $s_2$ to determine if the data block ($B_i$) is stored in one of the buckets $s_1$, $s_2$. The data processing hardware 124 may decrypt all of the blocks 102, 103 within each of the buckets by accessing the private keys locally stored on the encryption module 305. In the example shown, the data processing hardware 124 finds and removes the data block ($B_i$) from the downloaded bucket $s_1$. The removed data block ($B_i$) may be temporarily stored on the client device 120 in the memory hardware 122 and the remaining blocks 102, 103 from each downloaded bucket $s_1$, $s_2$ may be discarded. In some scenarios (not shown), the query 402 for the block ($B_i$) results in a miss when the block ($B_i$) is not found in the returned buckets $s_1$, $s_2$. In these scenarios, the overwrite phase includes the client device 120 executing a fake overwrite upon two randomly chosen buckets so that the client device 120 does not reveal the miss of the non-existent block ($B_i$) to the untrusted distributed system 140.

Figure 5C:
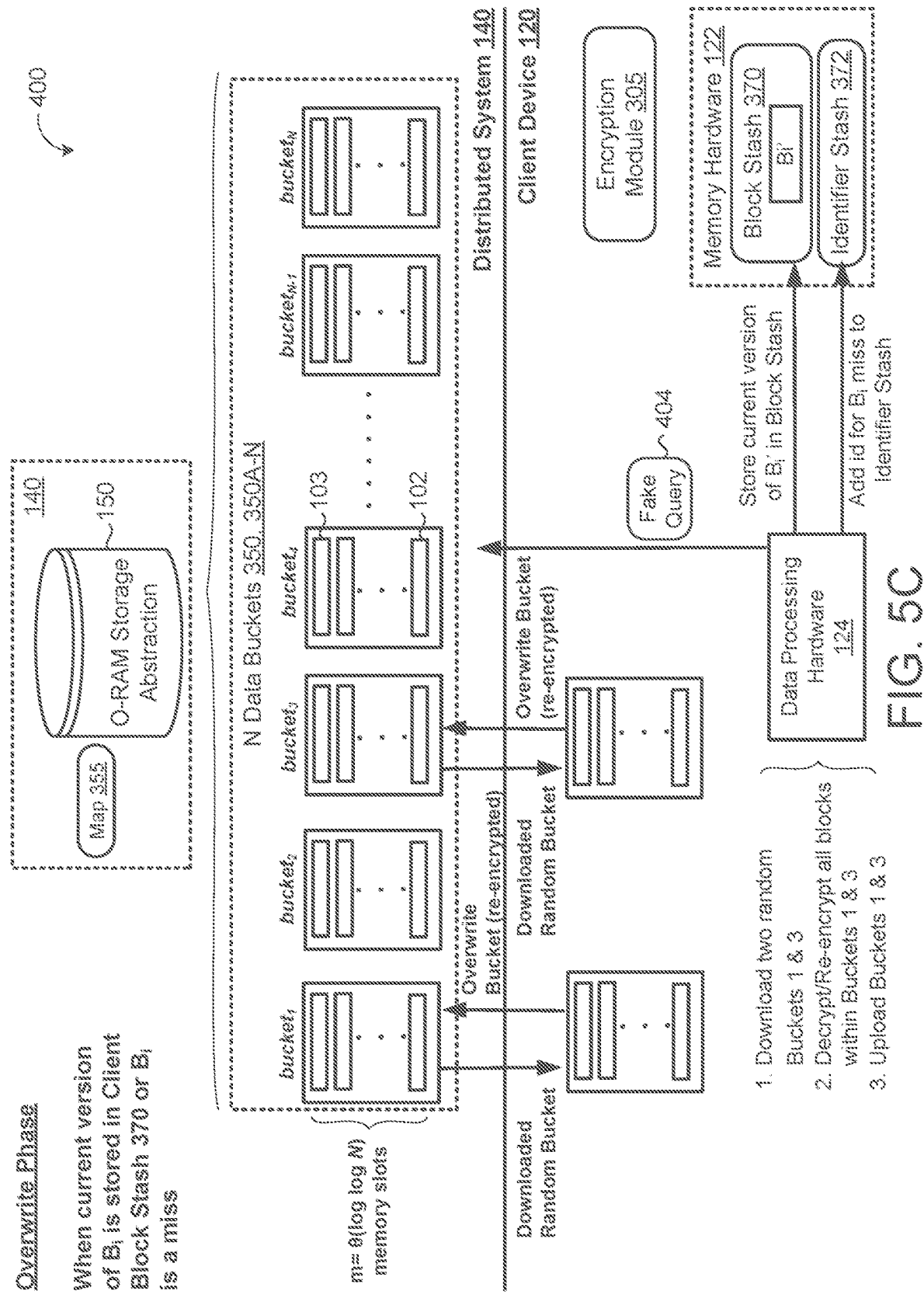

Referring to FIG. 5C, in some implementations, when the query 402 for the block ($B_i$) during the download phase of FIG. 5B results in the miss indicating that block ($B_i$) does not exist, the data processing hardware 124 adds the identifier id associated with the miss to the identifier stash 372. In order to obfuscate the addition of the identifier id to the identifier stash 372 and not reveal the non-existence of block ($B_i$) to the untrusted distributed system 140, the data processing hardware 124 sends a fake query 404 to the untrusted distributed system 140 to download two random data buckets 350 (e.g., bucket$_1$ and bucket$_3$) stored on the storage abstraction 150. The data processing hardware 124 then decrypts and re-encrypts all of the blocks 102, 103 within the randomly downloaded buckets with fresh randomness before uploading the buckets (e.g., bucket$_1$ and bucket$_3$) back to the distributed system 140 at the same positions within the storage abstraction 150. The downloading, decrypting, and re-encrypting on the two random buckets is referred to as a fake overwrite to conceal the block miss from the distributed system 140 because the contents of the randomly downloaded buckets (e.g., bucket$_1$ and bucket$_3$) have not been changed (except with a freshly computed ciphertext (e.g., a different encryption)). Thus, the untrusted distributed system 140 is unaware whether or not the retrieved data buckets (e.g., bucket$_1$ and bucket$_3$) are downloaded in response to a real query 402 or the fake query 404.

In other implementations, when the data block ($B_i$) does exist, FIG. 5C also shows the data processing hardware 124 storing a current version of the data block ($B_i$) in the block stash 370 with probability p on the memory hardware 122 of the client device 120 during the overwrite phase. The overwrite phase follows a corresponding download phase in which the data block ($B_i$) was retrieved either from the block stash 370 (FIG. 5A) or from the storage abstraction 150 (FIG. 5B). In some examples, the client device 120 executes a write operation on the data block ($B_i$) retrieved during the download phase to update the data block ($B_i$) with a new version of the data block ($B_i'$). In these examples, the updated new version of the data block ($B_i'$) is stored on in the block stash 370 with probability p during the overwrite phase. In other examples, the client device 120 simply executes a read operation on the data block ($B_i$) retrieved during the download phase. In these examples, the current version stored in the block stash 370 is unchanged from the version retrieved during the download phase.

In order to obfuscate the storing of the current version of the data block ($B_i'$) in the block stash 370 with probability p from the untrusted distributed system 140, the data processing hardware 124 sends the fake query 404 to the untrusted distributed system 140 to download two random data buckets 350 (e.g., bucket$_1$ and bucket$_3$) stored on the storage abstraction 150. The data processing hardware 124 then decrypts and re-encrypts all of the blocks 102, 103 within the randomly downloaded buckets with fresh randomness before uploading the buckets (e.g., bucket$_1$ and bucket$_3$) back to the distributed system 140 at the same positions within the storage abstraction 150. The downloading, decrypting, and re-encrypting on the two random buckets is referred to as a fake overwrite to conceal the storing of the current version of the data block ($B_i'$) in the block stash 370 because the contents of the randomly downloaded buckets (e.g., bucket$_1$ and bucket$_3$) have not been changed (except with a freshly computed ciphertext (e.g., a different encryption)). Thus, the untrusted distributed system 140 is unaware whether or not the retrieved data buckets (e.g., bucket$_1$ and bucket$_3$) are downloaded in response to a real query 402 or the fake query 404.

Figure 5D:
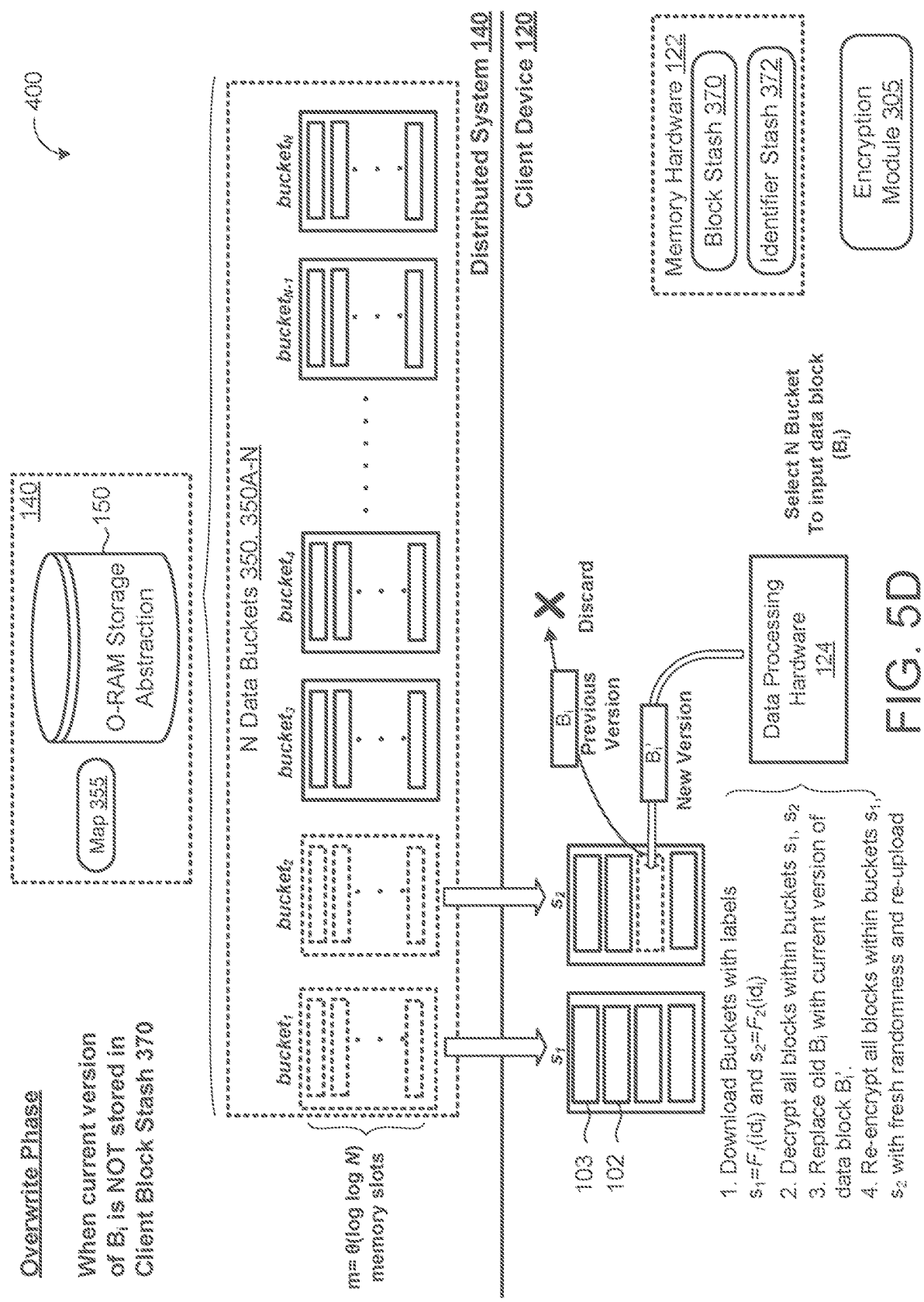

On the other hand, when the current version of the data block data block ($B_i'$) is not stored in the block stash 370 with the remaining probability 1−(C/N), FIG. 5D shows the client device 120 holding the current version of the data block ($B_i'$) (e.g., in the memory hardware 122) while the data processing hardware 124 sends a real query 402 to the untrusted distributed system 140 to download the pair of data buckets 350 with indices $s_1=F_1(id_i)$ and $s_2=F_2(id_i)$. Upon receiving the data buckets $s_1$, $s_2$, the data processing hardware 124 decrypts all of the blocks 102, 103, replaces the previous version of the data block ($B_i$) in the corresponding one of the buckets $s_1$, $s_2$ with the new version of the data block ($B_i'$), and re-encrypts all of the blocks 102, 103 including the new version of the data block ($B_i'$) within data buckets $s_1$, $s_2$ with fresh randomness. The data processing hardware 124 then re-uploads the buckets $s_1$, $s_2$ back to the distributed system 140 at the same positions within the storage abstraction 150.

In order to keep the size of the block stash 370 small, after the DP-OS instruction 400 executes θ(N log N) queries (q), the instruction 400 may use a block shuffle (e.g., by executing the oblivious permutation routine 450) to refresh the system by randomly choosing new seeds ($K'_1$, $K'_2$) (i.e., by generating to new PRFs $F_1'$, $F_2'$ and resetting the identifier stash 372) and reallocating blocks 102 to buffer buckets 360 based on the new seeds. Here, the distributed system 140 maintains a list of the keys associated with each data block 102. Thus, for each key, the two buckets 350 associated with keys ($K_1$, $K_2$) are downloaded, the blocks 102, 103 are decrypted to locate and re-encrypt the corresponding data block 102. Thereafter, the two buffer buckets 360 associated with keys ($K'_1$, $K'_2$) are downloaded, decrypted, and the data block 102 is added to the least loaded of the two buckets 350 before re-encrypting and re-uploading the two buckets 350 back to the distributed system 140. Accordingly, after the instruction 400 executes N queries (q), the shuffle buffer initializes new block and identifier stashes 370, 372, moves all the data blocks 102 from the old buckets 350 into the new data buckets 360 based on the new PRFs $F_1'$, $F_2'$, and deletes the old data buckets 350. The client device 120 may use the PosMap stored on the data processing hardware 124 when executing the shuffle buffer.

In some implementations, the DP-OS uses a hashing scheme of overlapping L buckets with each of the N data blocks 102 associated with a unique finite string identifier $k_1$-$k_n$ and hashed into one of L buckets. The L buckets may be outsourced to the untrusted distributed system 140 and each bucket may include a same size so that no information about the values of the identifiers $k_1$-$k_n$ can be inferred by the distributed system 140. The hashing scheme is configured to hide the values of the identifiers $k_1$-$k_n$ for the data blocks 102. The hashing scheme may use a binary tree or a reverse exponential tree, with leaf nodes occupying level 0 and levels increasing toward a root of the tree. The root of the tree occupies the largest level of the tree.

For a binary tree with N≤L≤2N leafs, each node of the tree may store exactly one block 102. The tree may be initially filled with dummy blocks 103, such as blocks with encryptions of zero. The leafs of the tree can be numbered from left to right from one to L, and each leaf may correspond to one of the L buckets. Here, the i-th bucket may include all blocks stored in nodes on the unique path from the i-th leaf to the root of the tree. Additionally, the client device 120 may optionally keep a block stash 370 to store blocks that overflow from the tree. FIG. 6 provides an example algorithm 600 initializing the binary tree by inputting the data blocks 102 in encrypted form into corresponding L buckets and executing a query (q) for a data block ($B_i$).

Figure 7:
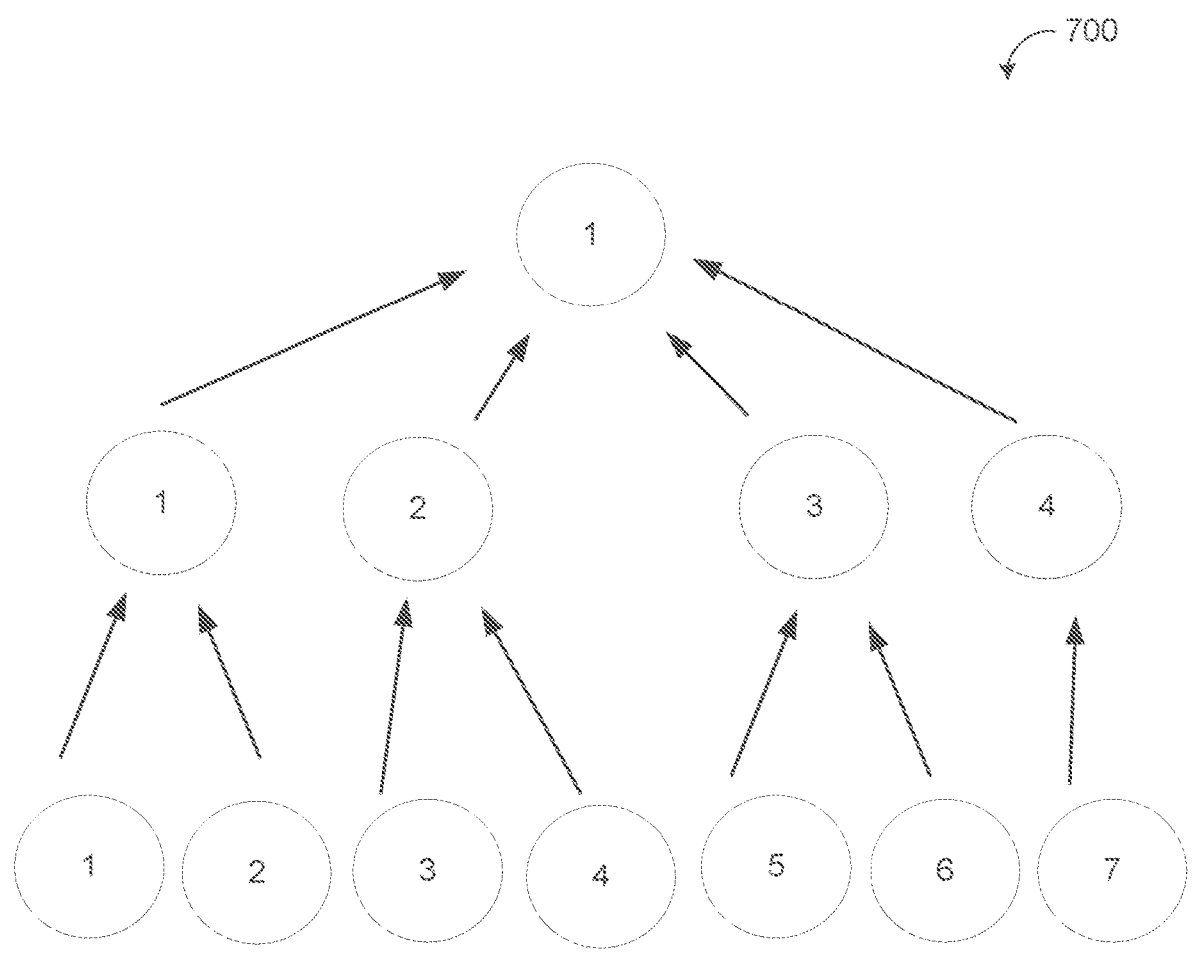
FIG. 7 is a schematic view of an example reverse exponential tree.

A reverse exponential tree may be parameterized by the number of data blocks stored N and the number of choices D. FIG. 7 shows an example reverse exponential tree 700 with N=7 data blocks and D=2 choices. The number of children at each level doubly exponentially increases when traversing up the tree. For L levels, all nodes have at most $C_1:=D$ children at level 1 and all nodes have at most $C_2:=(C_1)^2:=D^2$ children at level 2. At level i, all nodes have at most $C_i=(C_{i-1})^2:=(D^2)^{i-1}$. There will be no leaf nodes at level zero. All levels i greater than zero may be expressed as follows.

$$N_i := \left[ \frac{N}{D^{2^{i-1}}} \right] \quad (4)$$

The tree may stop after each level has exactly one node, which occurs at level $[\log_2 \log_D N]$. Each node at level i is labelled left to right from 1 to $N_i$. At levels i greater than or equal to one, node j∈{1, ..., $N_i$} will have $C_i$ children nodes labelled with (j−1) $C_i$+1 to j·$C_i$ at level i+1. Each node $N_i$ at each level i greater than or equal to zero might have less than $C_i$ children due to rounding. The reverse exponential tree further includes N buckets with the i-th bucket (1≤i≤N) including all nodes on the unique path from root to the leaf node labelled with i. The client device 120 may optionally store a block stash 370 to store overflow blocks 102. FIG. 8 provides an example algorithm 800 initializing the reverse exponential tree by inputting the data blocks 102 in encrypted form into corresponding N buckets and executing a query (q) for a data block ($B_i$).

Figure 9:
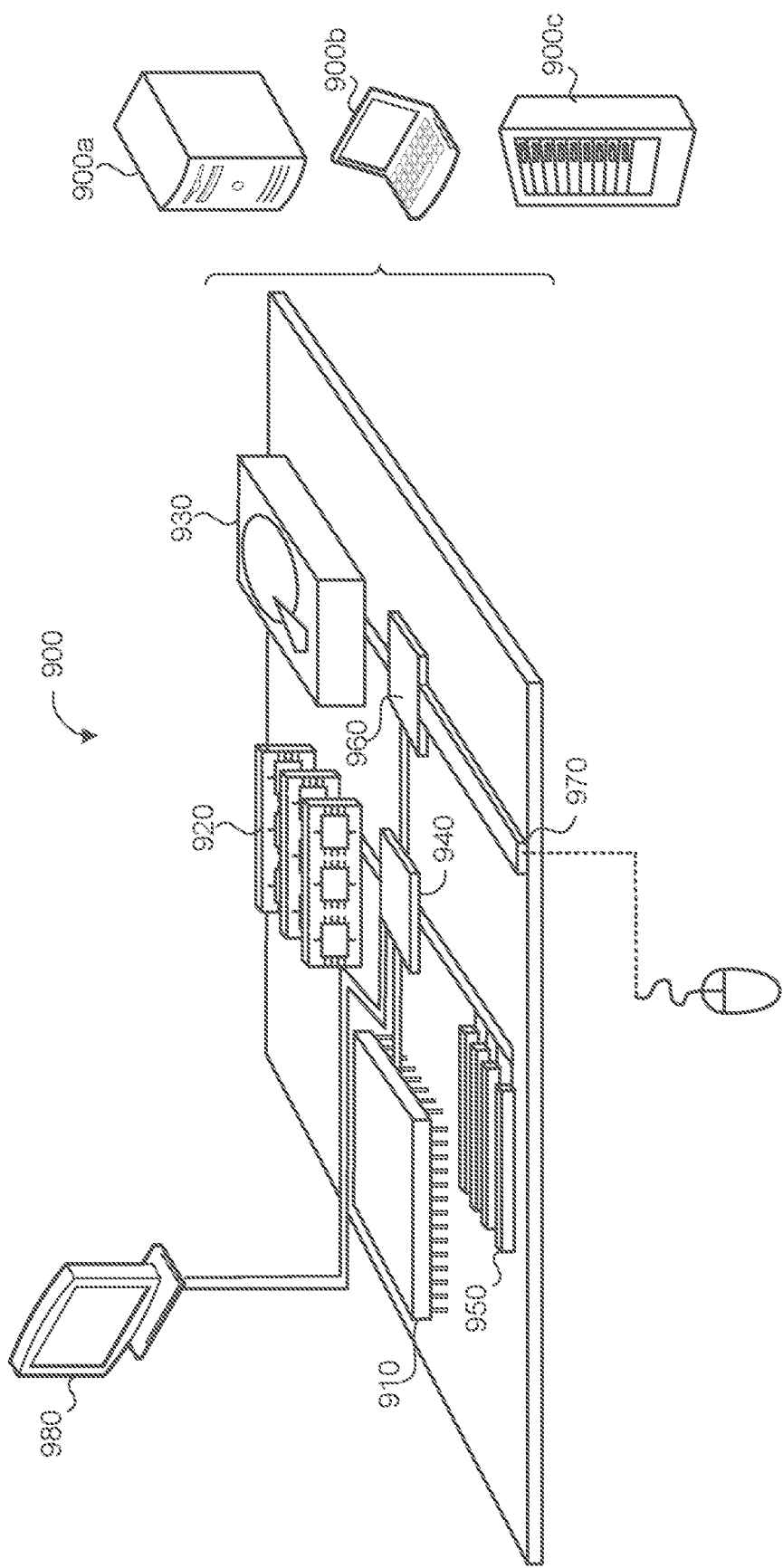
FIG. 9 is a schematic view of an example computing device that may be used to implement the systems and methods described herein.

FIG. 9 is schematic view of an example computing device 900 (e.g., data processing hardware) that may be used to implement the systems and methods described in this document. The computing device 900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 900 includes a processor 910, memory 920, a storage device 930, a high-speed interface/controller 940 connecting to the memory 920 and high-speed expansion ports 950, and a low speed interface/controller 960 connecting to low speed bus 970 and storage device 930. Each of the components 910, 920, 930, 940, 950, and 960, are interconnected using various busses, and may be mounted on a common motherboard or in other manners as appropriate. The processor 910 can process instructions for execution within the computing device 900, including instructions stored in the memory 920 or on the storage device 930 to display graphical information for a graphical user interface (GUI) on an external input/output device, such as display 980 coupled to high speed interface 940. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 920 stores information non-transitorily within the computing device 900. The memory 920 may be a computer-readable medium, a volatile memory unit(s), or non-volatile memory unit(s). The non-transitory memory 920 may be physical devices used to store programs (e.g., sequences of instructions) or data (e.g., program state information) on a temporary or permanent basis for use by the computing device 900. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 930 (e.g. memory hardware) is capable of providing mass storage for the computing device 900. In some implementations, the storage device 930 is a computer-readable medium. In various different implementations, the storage device 930 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 920, the storage device 930, or memory on processor 910.

The high speed controller 940 manages bandwidth-intensive operations for the computing device 900, while the low speed controller 960 manages lower bandwidth-intensive operations. Such allocation of duties is exemplary only. In some implementations, the high-speed controller 940 is coupled to the memory 920, the display 980 (e.g., through a graphics processor or accelerator), and to the high-speed expansion ports 950, which may accept various expansion cards (not shown). In some implementations, the low-speed controller 960 is coupled to the storage device 930 and low-speed expansion port 970. The low-speed expansion port 970, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 900a or multiple times in a group of such servers 900a, as a laptop computer 900b, or as part of a rack server system 900c.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
executing, by data processing hardware of a client device, an instruction to execute a query for a data block;
in response to executing the query, performing, by the data processing hardware, a download phase by:
  determining whether the data block is stored in a block stash on memory hardware residing at the client device; and
  when the data block is stored in the block stash:
    downloading the data block from the block stash;
    removing the data block from the block stash;
    sending a first fake query to a distributed system in communication with the data processing hardware, the first fake query retrieving a random data block stored in memory of the distributed system; and
    discarding the random data block retrieved from the distributed system; and
in response to executing the query and after performing the download phase, performing, by the data processing hardware, an overwrite phase by:

executing a read or write operation on the data block removed from the block stash or retrieved from the memory of the distributed system;

determining whether to store a current version of the data block in the block stash on the memory hardware residing at the client device or on the memory of the distributed system based on a probability; and when the current version of the data block is stored in the block stash:

sending a second fake query to the distributed system to retrieve another random data block stored in the memory of the distributed system;

decrypting the another random data block;

re-encrypting the another random data block with fresh randomness; and uploading the re-encrypted another random data block onto the memory of the distributed system.

2. The method of claim 1, further comprising, when the data block is not stored in the block stash during the download phase, sending, by the data processing hardware, a real query to the distributed system to retrieve the data block from the memory of the distributed system.

3. The method of claim 1, wherein executing the read or write operation on the data block during the overwrite phase comprises executing a write operation by updating the data block with a new version of the data block.

4. The method of claim 1, wherein the probability is less than (C/N), wherein C is a storage capacity of the block stash and N is a number of data blocks outsourced by the data processing hardware for storage on the distributed system.

5. The method of claim 1, further comprising, when the current version of the data block is not stored in the block stash during the overwrite phase:

sending, by the data processing hardware, a real query to the distributed system to retrieve the data block from the memory of the distributed system;

encrypting, by the data processing hardware, the current version of the data block; and uploading, by the data processing hardware, the encrypted current version of the data block onto the memory of the distributed system.

6. The method of claim 5, further comprising discarding, by the data processing hardware, the data block retrieved from the memory of the distributed system.

7. A method comprising:

executing, by data processing hardware of a client device, an instruction to execute a query for a data block;

in response to executing the query, performing, by the data processing hardware, a download phase comprising:

determining whether the data block is stored in a block stash on memory hardware residing at the client device; and when the data block is stored in the block stash:

downloading the data block from the block stash;

removing the data block from the block stash;

sending a first fake query to a distributed system in communication with the data processing hardware, the first fake query downloading two random data buckets stored in memory of the distributed system, each of the two random data buckets including multiple data blocks; and discarding the random data buckets retrieved from the distributed system; and in response to executing the query and after performing the download phase, performing, by the data processing hardware, an overwrite phase comprising:

executing a read or write operation on the data block removed from the block stash or obtained from a corresponding data bucket retrieved from memory of the distributed system;

determining whether to store a current version of the data block in the block stash or on the memory of the distributed system based on a probability; and when the current version of the data block is stored in the block stash:

sending a second fake query to the distributed system to download another two random data buckets stored in the memory of the distributed system, each another data bucket including multiple data blocks;

decrypting all of the data blocks within the another random data buckets;

re-encrypting the data blocks within the another random data buckets with fresh randomness; and uploading the another random data buckets including the re-encrypted data blocks onto the memory of the distributed system.

8. The method of claim 7, further comprising, when the data block is not stored in the block stash during the download phase:

sending, by the data processing hardware, a real query to the distributed system to download a pair of data buckets from the memory of the distributed system, each of the data buckets downloaded from the distributed system in response to the real query comprising multiple data blocks and a corresponding cryptographic identifier ($F(id_i)$) associated with an identifier ($id_i$) of the data block;

decrypting, by the data processing hardware, all of the data blocks within the two random data buckets;

determining, by the data processing hardware, whether one of the two random data buckets includes the data block; and when one of the data buckets includes the data block:

removing, by the data processing hardware, the data block from the corresponding data bucket; and discarding, by the data processing hardware, the remaining data blocks from the data buckets.

9. The method of claim 8, wherein the identifier ($id_i$) of the data block comprises a string.

10. The method of claim 7, wherein executing the read or write operation on the data block during the overwrite phase comprises executing a write operation by updating the data block with a new version of the data block).

11. The method of claim 7, wherein the probability is less than (C/N), wherein C is a storage capacity of the block stash and N is a number of data blocks outsourced by the data processing hardware for storage on the distributed system.

12. The method of claim 7, further comprising, when the current version of the data block is not stored in the block stash during the overwrite phase:

sending, by the data processing hardware, a real query to the distributed system to download a pair of data buckets from the memory of the distributed system, each of the data buckets downloaded from the distributed system in response to the real query comprising multiple data blocks and a corresponding cryptographic identifier ($F_1(id_i)$, $F_2(id_i)$) associated with an identifier ($id_i$) of the data block;

decrypting, by the data processing hardware, all of the data blocks within the data buckets;

replacing, by the data processing hardware, a previous version of the data block within one of the data buckets with the current version of the data block;

re-encrypting, by the data processing hardware, all of the data blocks including the current version of the data block within the data buckets; and uploading, by the data processing hardware, the data buckets including the re-encrypted data blocks onto the memory of the distributed system.

* * * * *